US010947366B2

United States Patent
Segal et al.

(10) Patent No.: US 10,947,366 B2
(45) Date of Patent: Mar. 16, 2021

(54) HOLLOW MINERAL TUBES COMPRISING ESSENTIAL OILS AND USES THEREOF

(71) Applicants: TECHNION RESEARCH & DEVELOPMENT FOUNDATION LTD., Haifa (IL); CARMEL OLEFINS LTD., Haifa (IL)

(72) Inventors: Ester Segal, Haifa (IL); Anita Vaxman, Haifa (IL); Rotem Shemesh, Haifa (IL); Maksym Krepker, Haifa (IL)

(73) Assignees: TECHNION RESEARCH & DEVELOPMENT FOUNDATION LTD., Haifa (IL); CARMEL OLEFINS LTD., Haifa (IL)

(*) Notice: Subject to any disclaimer, the term of this patent is extended or adjusted under 35 U.S.C. 154(b) by 0 days.

(21) Appl. No.: 15/561,168

(22) PCT Filed: Mar. 24, 2016

(86) PCT No.: PCT/IL2016/050324
§ 371 (c)(1),
(2) Date: Sep. 25, 2017

(87) PCT Pub. No.: WO2016/151593
PCT Pub. Date: Sep. 29, 2016

(65) Prior Publication Data
US 2018/0112068 A1 Apr. 26, 2018

(30) Foreign Application Priority Data
Mar. 26, 2015 (GB) .................................. 1505184

(51) Int. Cl.
*C08K 9/04* (2006.01)
*A01N 31/08* (2006.01)
*B65D 1/24* (2006.01)
*A01N 25/08* (2006.01)
*A01N 25/34* (2006.01)
*C08L 23/06* (2006.01)
*A01N 25/26* (2006.01)
*C08J 3/20* (2006.01)
*C08J 5/18* (2006.01)
*C08K 3/34* (2006.01)
*C08K 5/13* (2006.01)
*C08K 7/26* (2006.01)
*C01B 33/44* (2006.01)
*B65D 81/24* (2006.01)

(52) U.S. Cl.
CPC ............. *C08K 9/04* (2013.01); *A01N 25/08* (2013.01); *A01N 25/26* (2013.01); *A01N 25/34* (2013.01); *A01N 31/08* (2013.01); *B65D 81/24* (2013.01); *C08J 3/201* (2013.01); *C08J 5/18* (2013.01); *C08K 3/346* (2013.01); *C08K 5/13* (2013.01); *C08K 7/26* (2013.01); *C08L 23/06* (2013.01); *C01B 33/44* (2013.01);

*C08J 2323/06* (2013.01); *C08J 2377/02* (2013.01); *C08K 2201/011* (2013.01)

(58) Field of Classification Search
None
See application file for complete search history.

(56) References Cited

U.S. PATENT DOCUMENTS

| 5,651,976 | A | 7/1997 | Price et al. | |
|---|---|---|---|---|
| 9,332,751 | B2* | 5/2016 | Unal | A01N 25/10 |
| 2007/0106006 | A1* | 5/2007 | Cooper | C08K 3/04 524/445 |
| 2007/0202061 | A1* | 8/2007 | Riedlinger | A61K 8/26 424/59 |
| 2007/0292459 | A1 | 12/2007 | Cooper et al. | |
| 2008/0220036 | A1* | 9/2008 | Miltz | A01N 25/10 424/409 |
| 2010/0272831 | A1 | 10/2010 | Lagaron Cabello et al. | |
| 2011/0142899 | A1 | 6/2011 | Lagaron Abello et al. | |
| 2012/0152149 | A1 | 6/2012 | Mijolovic et al. | |
| 2012/0157548 | A1 | 6/2012 | Mijolovic et al. | |
| 2014/0187413 | A1 | 7/2014 | Lagaron Cabello et al. | |

FOREIGN PATENT DOCUMENTS

| EP | 1464232 A1 | 10/2004 | | |
|---|---|---|---|---|
| WO | 2014104868 A1 | 7/2014 | | |
| WO | WO-2014104868 A1 * | 7/2014 | ............. | A61K 31/05 |
| WO | 2015019211 A1 | 2/2015 | | |

OTHER PUBLICATIONS

Hendessi (*Antibacterial sustained-release coatings from halloysite nanotubes/waterborne polyurethanes*, Progress in Organic Coatings, 101, 2016, pp. 253-261).*
Zhong (Preparation of halloysite nanotubes supported 2-mercaptobenzimidazole and its application in natural rubber. Composites: Part A, 2015, 73, pp. 63-71).*
Google patents translation of WO 2014104868 (2014, 14 pages).*
Rotem Shemesh et al: "Antibacterial and antifungal LDPE films for active packaging", Polymers for Advanced Technologies, vol. 26, pp. 110-116, Dec. 1, 2014.
Giuseppe Cavallaro et al: "Modified Halloysite Nanotubes: Nanoarchitectures for Enhancing the Capture of Oils from Vapor and Liquid Phases", ACS Applied Materials & Interfaces 2014, vol. 6, No. 1, pp. 606-612, Published Dec. 6, 2013.

(Continued)

*Primary Examiner* — Brieann R Johnston
(74) *Attorney, Agent, or Firm* — The Roy Gross Law Firm, LLC; Roy Gross

(57) ABSTRACT

Compositions comprising hollow mineral tubes comprising one or more essential oils (EOs) are disclosed. A process is provided for generating hollow mineral tube comprising one or more essential oils (EOs) and incorporating same in and/or on a substrate. Further disclosed are articles and methods, which are useful in inhibiting, reducing and/or retarding biofilm formation.

12 Claims, 26 Drawing Sheets

(56) References Cited

OTHER PUBLICATIONS

Nicole Didry et al: "Activity of thymol, carvacrol, cinnamaldehyde and eugenol on oral bacteria", Pharmaceutica Acta Helvetiae, vol. 69, 1994, pp. 25-28.
Mendel Friedman: "Chemistry and Multibeneficial Bioactivities of Carvacrol (4-Isopropyl-2-methylphenol), a Component of Essential Oils Produced by Aromatic Plants and Spices", Journal of Agricultural and Food Chemistry, 2014, vol. 62, No. 31, pp. 7652-7670.
Verónica Otero et al: "Evaluation of two antimicrobial packaging films against *Escherichia coli* O157:H7 strains in vitro and during storage of a Spanish ripened sheep cheese (*Zamorano*)", Food Control, vol. 42, 2014, pp. 296-302.
International Search Report of PCT/IL2016/050324 Completed Jul. 26, 2016; dated Jul. 26, 2016 6 Pages.
Written Opinion of ISR of PCT/IL2016/050324 Completed Jul. 26, 2016; dated Jul. 26, 2016 7 Pages.
Rotem Shemesh et al: "LDPE/Clay/Carvacrol Nanocomposites with Prolonged Antimicrobial Activity", Journal of Applied Polymer Science, vol. 132, issue 2, Jan. 10, 2015, pp. 1-8.
Didry N et al; "Antibacterial activity of thymol, carvacrol and cinnamaldehyde alone or in combination"; Pharmazie; vol. 48, No. 4, Apr. 1993, pp. 301-304.

\* cited by examiner

FIG. 6A
FIG. 6B

HOLLOW MINERAL TUBES COMPRISING ESSENTIAL OILS AND USES THEREOF

RELATED APPLICATIONS

This application is a National Phase of PCT Patent Application No. PCT/IL2016/050324 having International filing date of Mar. 24, 2016, which claims the benefit of priority from GB Patent Application No. 1505184.0, filed on Mar. 26, 2015. The contents of the above applications are all incorporated by reference as if fully set forth herein in their entirety.

FIELD OF THE INVENTION

The present invention, in some embodiments thereof, relates to hollow mineral tube having applied thereon one or more essential oils, substrates containing same, processes of preparing same, and uses thereof in, for example, reducing or preventing growth of microorganisms.

BACKGROUND OF THE INVENTION

Polymeric films are susceptible to bacterial colonization and biofilm formation. In the food packaging industry, it would be advantageous to convert these polymeric films to reduce, inhibit or prevent the development of microorganisms that are present in the packed food or on the packaging material.

Antimicrobial function in polymers can be achieved by adding active antimicrobial ingredients into the polymeric matrix or by using polymers with intrinsic antimicrobial properties. The latter are suffering from limited applicability as a packaging for solid and semi-solid foods and their properties are inferior in comparison to common synthetic polymers.

Antimicrobial agents incorporated into polymers have to be selected based on their spectrum of activity, mode of action and chemical composition in order to be compatible with the polymer material and its specific application, as well as, effectively manage the target organism Different chemicals, such as metal ions, organic acids and their salts have been successfully incorporated as antimicrobial substances into plastic materials.

Essential oils (EOs) are natural substances, recognized as GRAS (Generally Recognized as Safe), derived from plants that possess antimicrobial activity against a wide range of microorganisms, including bacteria, yeast and molds (Friedman, M., *Journal of Agricultural and Food Chemistry* 2014, 62 (31), 7652-7670). These compounds are commonly used as safe, effective, and natural remedies for diseases in traditional medicine.

One major drawback of EOs is their volatile character, which limits their incorporation into polymers to mainly cold-coating technologies (Otero, V. et al. *Food Control* 2014, 42 (0), 296-302).

U.S. patent application publication no. US 2007/0292459 discloses compositions comprising hollow mineral microtubules which may be provided for the delivery of three or more active agents in sequence.

SUMMARY OF THE INVENTION

The present invention, in some embodiments thereof, relates to hollow mineral tube having applied thereon one or more essential oils, substrates containing same, processes of preparing same, and uses thereof in, for example, reducing or preventing growth of microorganisms.

According to an aspect of some embodiments of the present invention, there is provided a composition-of-matter comprising a hollow mineral tube having deposited on at least one surface thereof one or more essential oils (EOs). In some embodiments, the EOs are characterized by vapor pressure of at least about 0.001 mmHg at about 20° C.

In some embodiments, the EOs are selected from the group consisting of carvacrol, thymol, citral, or isomers, derivatives and mixtures thereof.

In some embodiments, the hollow mineral tube is selected from the group consisting of halloysite, cylindrite, boulangerite, imogolite, and mixtures thereof. In some embodiments, the hollow mineral tube is nanosized.

In some embodiments, the composition-of-matter is capable of withstanding temperature of up to about 400° C. with having less than 50% evaporation of the one or more EOs.

In some embodiments, the composition-of-matter further comprises a substrate. In some embodiments, a plurality of the hollow mineral tube is incorporated in and/or on at least a portion of the substrate.

In some embodiments, the substrate is selected from the group consisting of a silicon substrate, an organosilicon substrate, a glass substrate, a metallic substrate, a polymeric substrate, a ceramic substrate and any combination thereof.

In some embodiments, the polymeric substrate is selected from the group consisting of: polyolefins, polyesters, polyamides Polyurethanes, and combination thereof.

In some embodiments, the polymeric substrate is selected from the group consisting of: nylon, polyamine, polyethylene (PE), and polypropylene, and any derivative thereof. In some embodiments, the PE is low density PE (LDPE).

According to an aspect of some embodiments of the present invention, the composition-of-matter is identified for use in inhibiting a growth of a pathogenic microorganism. In some embodiments, one or more EOs act in synergy.

According to an aspect of some embodiments of the present invention, there is provided an article comprising the composition-of-matter.

In some embodiments, the article is selected from the group consisting of a package (e.g., food package, medical device package, agricultural package, and biological sample package), microelectronic device, a microelectromechanic device, a photovoltaic device, a microfluidic device, a medical device, a textile, a construction element (e.g., paints, walls, windows, handles).

According to an aspect of some embodiments of the present invention, there is provided a method of inhibiting or reducing a formation of load of a microorganism and/or a formation of a biofilm, in and/or on an article, the method comprising incorporating the composition-of-matter in and/or on the article. In some embodiments, the microorganism is selected from bacteria, molds and fungi. In some embodiments, the biofilm is a bacterial biofilm.

According to an aspect of some embodiments of the present invention, there is provided of preparing composition-of-matter comprising a hollow mineral tube having deposited on at least one surface thereof one or more essential oils (EOs), the process comprising depositing the EOs on the hollow mineral tube by applying a deposition route selected from: plating, chemical bath deposition (CBD), spin coating, chemical vapor deposition (CVD), ultrasonic irradiation, thereby obtaining the composition-of-matter. In some embodiments, the ultrasonic irradiation is applied by subjecting a mixture of one or more EOs being in contact with the hollow mineral tube to ultrasonic irradiation. In some embodiment, the hollow mineral tube and the EOs are in weight ratio ranges from 4:1 to 1:4.

In some embodiment, the process further comprises a sequential step of contacting the substrate or a portion thereof with the hollow mineral tube. In some embodiment, the contacting is effected by melt-compounding the substrate or a portion thereof with the hollow mineral tube.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3C shows a transmission electron micrograph of HNTs and HNPs finely dispersed within a polymer matrix.

FIGS. 6A-B presents images of PA/carvacrol (FIG. 6A) showing large holes and rupture film as a "fishnet" (FIG. 6B) PA/(HNTs/2% carvacrol) demonstrating high-quality transparent films (PA: polyamide)

DESCRIPTION OF SPECIFIC EMBODIMENTS OF THE INVENTION

The present invention, in some embodiments thereof, relates to hollow mineral tube having applied thereon one or more essential oils, substrates containing same, processes of preparing same, and uses thereof in, for example, reducing or preventing growth of microorganisms.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

In one embodiment, the present invention provides compositions comprising naturally hollow mineral tube (e.g., halloysite nanotubes; HNT) and highly volatile compounds such as essential oils encapsulated within the mineral tubes. The invention further provides incorporation of the compositions into polymers. As exemplified hereinbelow, the polymers unexpectedly exhibit a high level of biocompatibility and very low toxicity. Advantageously, the polymers show prolonged and efficient bacteriocidal, as well as, fungicidal activity.

Figure 1:
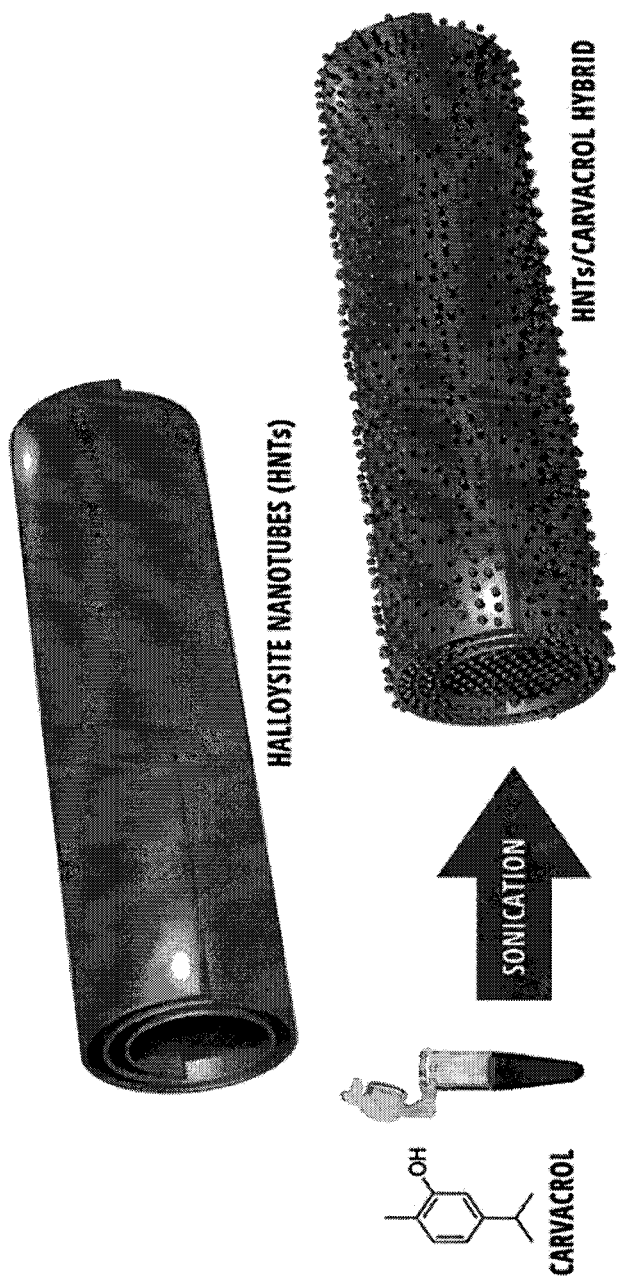
FIG. 1 presents a schematic illustration of halloysite nanotubes (HNTs) loaded with carvacrol molecules (a model antimicrobial EO).

As described hereinbelow, in some embodiments, the HNTs may be employed as nano-carriers for carvacrol, a model antimicrobial EO. Taking into consideration their unique hollow tubular structure, a pre-compounding step may be conducted, in which HNTs/carvacrol hybrids are produced, so as to promote loading and encapsulation of the carvacrol into the nanotubes, as schematically illustrated in FIG. 1. Subsequently, the HNTs/carvacrol hybrids may be melt-compounded with low-density polyethylene (LDPE) and films comprising same were produced.

The ability of the HNTs carriers to retain e.g., volatile carvacrol during the high-temperature melt-processing and their ability to sustain carvacrol release from the films are demonstrated in the Example section that follows.

Since, in some embodiments, the HNTs/carvacrol hybrids are incorporated (e.g., melt-compounded) with LDPE, the resulting LDPE films exhibit outstanding antimicrobial properties with a broad spectrum of antimicrobial inhibitory activity.

Compositions-of-Matter:

According to an aspect of some embodiments of the present invention there is provided a composition-of-matter comprising a hollow mineral tube having deposited on at least one surface thereof one or more essential oils (EOs).

The term "hollow mineral tube", as used hereinthroughout, means an elongated tube comprising mineral substrate, having a cavity within.

The term "cavity" as used herein means the space surrounded by the wall of the mineral substrate tube.

As used herein the term "surface" may refer to either outer surface or to the inner surface of the tube.

The terms "inner surface", as used herein, means the inside or interior surface of the hollow tube. The term "outer surface" as used herein, means the outside surface of the hollow tube.

An important effect of increasing the thermal stability of essential oil compounds may include raising upper operating temperature of the compounds.

In some embodiments, raising the upper operating temperature of an EO may allow carrying out the desired activity involving the EO (e.g., antimicrobial activity), or to protect the EO compound from long term effects of being stored at elevated temperatures (e.g., above room temperature).

In some embodiments, the incorporation of certain EO(s) in hollow mineral tubes may significantly enhance the thermal stability of the EO(s) compared to the pure (neat) compound of the EO(s).

In some embodiments, the incorporation of certain EO(s) in hollow mineral tubes being further incorporated in and/or on a portion of substrate (e.g., a polymer as described hereinbelow, such as LDPE) may significantly enhance the thermal stability of the EO(s) compared to the pure (neat) compound of the EO(s).

In some embodiments, the thermal stability is expressed by "$\Delta T$" which refers to the difference in thermal degradation/evaporation temperature between the incorporated compound and the neat compound (EO).

In some embodiments, the term "thermal degradation temperature" refers to the onset temperature of 5% degradation/evaporation.

In some embodiments, the term "thermal degradation temperature" refers to the temperature at the point of the thermal gravimetric analysis (TGA) curve, which indicates the point where the degradation/evaporation rate is maximum.

In some embodiments, the thermal stability of the incorporated EO(s) is increased by a defined $\Delta T$.

In some embodiments, $\Delta T$ is at least 5, 10, 15, 20, 25, 30, or 40 (° C.) above the thermal degradation temperature of the neat compound(s).

In some embodiments, the hollow mineral tube and the EO(s) are in a weight ratio of e.g., 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10, including any value and range therebetween. Herein "EOs" refers to the total weight of the EOs incorporated in the tube.

In some embodiments, "EOs" refers to a combination of two or more EOs. In some embodiments, "EOs" refer to a combination of two EOs.

In some embodiments, the EO is carvacrol (CV). In some embodiments, the EO is thymol (TY). In some embodiments, the EO is citral. In some embodiments, the EO is gerniol.

In some embodiments, "EOs" refers to a combination of carvacrol (CV) and thymol (TY).

In some embodiments, the combination of carvacrol and thymol is in a weight ratio that ranges from 4:1 to 1:4. In some embodiments, carvacrol and thymol are in a weight ratio that ranges from 1:3 to 4:1 (carvacrol to thymol). In some embodiments, carvacrol and thymol are in a weight ratio that ranges from 1:4 to 3:1 (carvacrol to thymol). In some embodiments, carvacrol and thymol are in a weight ratio that ranges from 1:2 to 3:1 (carvacrol to thymol). In some embodiments, carvacrol and thymol are in a weight ratio that ranges from 1:3 to 3:1 (carvacrol to thymol). In some embodiments, carvacrol and thymol are in a weight ratio that ranges from 1:2 to 3:1 (carvacrol to thymol). In some embodiments, carvacrol and thymol are in a weight ratio that ranges from 1:3 to 2:1 (carvacrol to thymol). In some embodiments, carvacrol and thymol are in a weight ratio that ranges from 1:2 to 2:1 (carvacrol to thymol).

In some embodiments, carvacrol and thymol are in a weight ratio of about 1:1 (e.g., 1.1:1 to 1:1.1).

Mineral Nanostructures:

Non-limiting examples of hollow mineral tubes includes halloysite, cylindrite, boulangerite, imogolite, and mixtures thereof.

Several naturally occurring minerals will, under appropriate hydration conditions, form tubules and other micro- or nano-structures suitable for use in the present invention. The most common of these is halloysite, an inorganic aluminosilicate belonging to the kaolinite group of clay minerals [Bates et al., "Morphology and structure of endellite and halloysite", *American Minerologists* 35 463-85 (1950)]. The mineral has the chemical formula $Al_2O_3 \cdot 2SiO_2 \cdot nH_2O$. In some forms (e.g., hydrated form) the mineral forms tubules. Halloysite is an economically viable material that can be mined from the corresponding deposit as a raw mineral.

Morphologically, both hydrated and dehydrated halloysite comprise layers of single silica tetrahedral and alumina octahedral units. They differ in the presence or absence of a layer of water molecules between the silicate and alumina layers.

Water molecules interposed between the gibbsite ($Al_2O_3$) and silicate ($SiO_2$) layers results in a mismatch between the layers, which is compensated by curvature of the layers.

Halloysite naturally occurs as small cylinders which average 30 nm in diameter with lengths between 0.5 and 10 μm.

In some embodiments of the present invention, at least one dimensions of the hollow mineral tube is nanosized.

In some embodiments of the present invention, the length of the tube is e.g., about 100 nm, about 200 nm, about 300 nm, about 400 nm, about 500 nm, about 600 nm, about 700 nm, about 800 nm, about 900 nm, about 1000 nm, about 1100 nm, about 1200 nm, about 1300 nm, about 1400 nm, about 1500 nm, about 1600 nm, about 1700 nm, about 1800 nm, about 1900 nm, about 200 nm, including any value therebetween.

In some embodiments of the present invention, the internal diameter ranges e.g., from about 5 to about 400 nm, from about 30 to about 250 nm, from about 10 to about 200 nm, or from about 15 to about 100 nm. In exemplary embodiments, the internal diameter is about 20 nm.

In some embodiments of the present invention, the external diameter is smaller than e.g., 400 nm, 300 nm, 200 nm, 100 nm. In exemplary embodiments, the external diameter is smaller than 100 nm.

In some embodiments, the composition-of-matter comprises a plurality of nanotubes (e.g., halloysite nanotubes; HNTs), and at least 10%, 20%, 30%, 40%, 50%, 60%, 70%, 80%, 90%, 95%, 98%, 99%, 99.9%, or all of the nanotubes are as described herein, e.g., in shape, in average sizes of the length, in external diameter or in internal diameter.

Other exemplary minerals that will, under appropriate conditions, form tubules and are conceivable to be utilized in the context of the present invention, are cylindrite ($Pb_3Sn_4FeSb_2Si_4$), boulangerite ($Pb_5Sb_4S_{11}$), both belongs to the class of minerals known as sulfosalts, and Imogolite which is an aluminium silicate clay mineral with the formula: $Al_2SiO_3(OH)_4$.

Essential Oils (EOs):

As used herein, the term "essential oil" means a volatile oil derived from the leaves, stem, flower or twigs of plants or synthetically-made compounds that have the same chemical attributes.

Chemically, the plant essential oil or derivative thereof, which may be extracted from natural sources or synthetically made, typically comprises, without limitation, an acyclic monoterpene alcohol or aldehyde, a benzenoid aromatic compound comprising at least one oxygenated substituent or side chain, or a monocarbocyclic terpene generally having a six-membered ring bearing one or more oxygenated substituents. The term "essential oil" is also meant to include derivatives thereof, including racemic mixtures, enantiomers, diastereomers, hydrates, salts, solvates, metabolites, analogs, and homologs. The term "essential oil" also encompasses variants or mimics of such compounds that share one or more of their characteristics or functions.

Essential oils can be pure single compounds. However, other essential oils are mixtures of compounds, for example turpentine oil (pinene and dipentene). Other essential oils, their chemistry and plant families are known in the art. When the essential oil is a mixture of compounds, the present invention encompasses each of the constituent compounds of the essential oil.

As plant essential oil compounds are known and used for other uses, they may be routinely prepared by a skilled artisan by employing known methods. Exemplary methods for deriving an essential oil include, but are not limited to, steam distillation, pressing fruit rinds, solvent extraction, macerating the flowers and leaves in fat and treating the fat with solvent, enfleurage and synthetically.

Exemplary essential oils or their constituents include, but are not limited to, *eucalyptus* oil, geranium oil, lemongrass oil, petitgrain oil, rosemary oil, thyme oil (white and red), lavender oil, tea tree oil, *Tagete minuta* oil, lovage oil, *Lippia javanica* oil, lemon oil, orange oil, grapefruit oil, oil of bergamot, galbanun oil, acetophenone, allyl caprate, α-amylcinnamic aldehyde, amyl salicylate, trans-anethole, anisaldehyde, benzyl alcohol, benzyl acetate, benzyl propionate, borneol, β-caryophyllene, caryophyllene, cinnamyl acetate, cinnamaldehyde, cinnamic alcohol, cinnamyl alcohol, carvacrol, carveol, citral, citronellal, citronellol, cumin aldehyde, cyclamen aldehyde, almond (Benzaldehyde). decanol, dimethyl salicylate, ethyl butyrate, ethyl caprate, ethyl cinnamate, eucalyptol (cineole), eugenol, iso-eugenol, galaxolide, geranial, geraniol, germacrene D, guaiacol, hexenol, α-hexylcinnamic aldehyde, hydroxycitrolnellal, ionone, ipsdienone, isopropenyl acetophenone, linalol, linalyl acetate, d-limonene, menthol, p-methylacetophenone, methyl anthranilate, methyl dihydrojasmonate, methyl eugenol, methyl ionone, methyl salicylate, neral, α-phellandrene, pennyroyal oil, perillaldehyde, 1- or 2-phenyl ethyl alcohol, 1- or 2-phenyl ethyl propionate, piperonal, piperitenone, piperonyl acetate, piperonyl alcohol, o-isopropenyl anisole, D-pulegone, terpinen-4-ol, terpinyl acetate, A-tert-butylcyclohexyl acetate, α-terpineol, thymol, trans-tagetenone, myrcenone, linalool, octyl gallate carvone, ipsenone, α-phellandrene, piperitenone, gamma-undecalactone, undecenal, vanillin, vitamin E, and ethyl vanillin.

In exemplary embodiments, the EO is selected from carvacrol, thymol, or a combination thereof.

Typically, but not exclusively, the term "volatile" in the context of EOs is meant to refer to having a low melting point i.e. less than about 70° C. It is therefore noteworthy that in the room temperature (i.e. about 25° C.) some of the EOs may be in a solid state (e.g., thymol) and some in a liquid (e.g., carvacrol).

Additionally, or alternatively, the term "volatile" refers to materials that are liquid under ambient conditions and have a vapor pressure as measured at 25° C. of e.g., at least about 0.001 mmHg, or, in some embodiments, from about 2.0 mmHg to about 6.0 mmHg, or, in some embodiments, from about 0.002 mmHg to about 2.0 mmHg, or, in some embodiments.

Exemplary vapor pressure values (at 20° C.-25° C.) of EOs used in the context of the present disclosure are as follows: carvacrol: 0.023 mmHg; Thymol: 0.002 mmHg; citral: 0.22 mmHg; geraniol: 0.2 mmHg; linalool: 0.17 mmHg.

Additionally, or alternatively, the term "volatile" refers to materials having a boiling point at one atmosphere of pressure (1 atm) of less than 250° C.

In some embodiments, the hollow tube surface is chemically modified, in order to optimize the loading of the EOs Sonochemically-Prepared Compositions-of-Matter:

Any one of the compositions-of-matter described herein, and any embodiments thereof, including exemplary compositions-of-matter as described herein, can be prepared by any method known in the art for obtaining hollow tubes/EO hybrids (also referred to hereinthroughout as "pre-compound").

In some embodiments, a composition-of-matter described herein, in some embodiments thereof, including exemplary compositions-of-matter described herein, is prepared by subjecting a mixture of a hollow tubes and EOs to ultrasonic irradiation. Such compositions-of-matter are also referred to herein as "sonochemically-prepared".

As used herein, the terms "sonochemical", "ultrasonic irradiation", "sonication" and any grammatical derivative thereof, may be used herein interchangeably, and refer to a method of exposure to sonic power, generally in the ultrasonic range of frequencies.

The term 'sonochemistry' refers to the study or use of sonochemical irradiation.

In some embodiments, ultrasonic irradiation is applied on a mixture (e.g., an aqueous solution) as described herein (e.g., Halloysite nanotubes and carvacrol).

In some of any of the embodiments described herein, the ultrasonic irradiation is applied at wave of e.g., at least 100 W, at least 200 W, at least 300 W, at least 400 W, at least 500 W, at least 600 W, at least 700 W, at least 800 W, at least 900 W, or at least 1 kW.

In an exemplary embodiment, the ultrasonic irradiation is applied at a wave of 750 W.

In some embodiments, the ultrasonic irradiation is applied at a wave of 750 W, at at least 10% efficiency, at at least 20% efficiency, at at least 30% efficiency, at at least 40% efficiency, at at least 50% efficiency, at at least 60% efficiency, at at least 70% efficiency, at at least 80% efficiency, at at least 90% efficiency, or 100% efficiency.

In an exemplary embodiment the ultrasonic irradiation is applied at 40% efficiency.

Further embodiments of this aspect of present embodiments are included hereinbelow, under "the process", and form an integral part of embodiments relating to sonochemically-prepared compositions-of-matter.

The Substrate:

In some embodiments, the composition-of-matter further comprises a substrate.

In some embodiments, a plurality of the hollow mineral tube (e.g., nanotube) is incorporated in and/or on at least a portion of the substrate (denoted herein as "substrate/(hollow tube/EOs hybrid)").

In some embodiments, the hollow tube is in a weight percent of e.g., 1%, 2%, 3%, 4%, 5%, 6%, 7%, 8%, 9%, 10%, 15%, 20%, 25%, 30%, 35%, 40%, 45%, or 50%, including any value and range therebetween, by total weight of the substrate/(hollow tube/EOs hybrid. In some embodiments, the hollow tube is in a weight percent of e.g., 1%, 2%, 3%, 4%, 5%, 6%, 7%, 8%, 9%, 10%, 15%, 20%, 25%, 30%, 35%, 40%, 45%, or 50%, including any value and range therebetween, by total weight of the hollow tube/EOs.

In some embodiments, the substrate is melt-compounded with the hollow tubes/EO hybrids (e.g., HNTs/carvacrol hybrids), as described hereinbelow, under "The Process".

Substrates having surfaces of widely different chemical nature can be successfully utilized for melt-compounding process as described herein. By "successfully utilized" it is meant that (i) the hollow tubes/EO(s) hybrids are successfully incorporated in/on the substrate's surface upon e.g., thermal processing thereof; and (ii) the resulting substrate's surface is imparted with antimicrobial activity.

Substrate's surfaces usable according to some embodiments of the present invention can therefore be hard or soft, organic or inorganic surfaces, including, but not limited to, glass surfaces; porcelain surfaces; ceramic surfaces; polymeric surfaces such as, for example, plastic surfaces, rubbery surfaces, and surfaces comprising or made of polyolefins and any derivative thereof, polymers such as polypropylene (PP), polycarbonate (PC), polyethylene (PE), high-density polyethylene (HDPE), low-density polyethylene (LDPE), unplasticized polyvinyl chloride (PVC), polyamides (e.g., nylon), polyamine, polypropylene, polyesters (e.g., polyethylene terephthalate), and fluoropolymers including but not limited to polytetrafluoroethylene (PTFE, Teflon®), metallic substrates and surfaces thereof (e.g., gold surfaces); or can comprise or be made of silicon, organosilicon, stainless steel, gold, polymers as described herein or include any combination of the above.

The term "polymer" refers to a molecule (or a material composed of such molecules) of high relative molecular mass, the structure of which essentially comprises the multiple repetition of units derived, actually or conceptually, from molecules of low relative molecular mass. In some embodiments, the substrate comprises a combination (e.g., blend) of one or more polymers.

The term "polyolefin" as used herein includes any polymerized olefin and can be linear, branched, aliphatic, aromatic, substituted, and/or unsubstituted. Also included within the term "polyolefin" are homopolymers of olefin, copolymers of olefin, copolymers of an olefin and a non-olefinic comonomer copolymerizable with the olefin (such as vinyl monomers, modified polymers thereof, and the like).

Optionally, components of the polymer may comprise one or more tackifier(s), plasticizer(s), flame retardant(s), UV stabilizer(s), filler(s), hindered amine light stabilizer(s), antioxidant(s), colorant(s), and/or crosslinker(s) (for example, photocrosslinker). To adjust the tack level, one or more tackifiers may be added to the components before or during melt blending.

Various processing aids may be applied in order to achieve homogenous dispersion of the hollow tubes e.g., nanotubes or nanocapsules, within the polymeric substrate to improve the polymer nanocomposite properties, e.g., by compatibilizing coating of the tube.

In exemplary embodiments, low-density polyethylene (LDPE) and polypropylene (PP) and poly(ethylene terephthalate) (PET) are used.

It is noteworthy that the polymers vary in their polarity. Accordingly, in some embodiments, different modifications of the external surface of the HNTs nanocapsules may be performed.

In exemplary embodiments, the polymer is LDPE, and the EOs are selected from TY, CV or a combination thereof (e.g., LDPE/(HNT/CV-TY).

The Articles:

According to an aspect of some embodiments of the present invention there is provided an article which comprises any one of the composition-of-matter as described herein.

Any article that may benefit from a compositions-of-matter comprising a hollow mineral tube and one or more essential oils (EOs) described herein is contemplated.

Exemplary articles of manufacturing include, but are not limited to, microelectronic device, a microelectromechanic device, a photovoltaic device, a microfluidic device, a medical device, a textile, a package and a construction element.

Exemplary article include packages or containers, for example, food packages and containers, beverage packages and containers, medical device packages, agricultural packages and containers (of agrochemicals), blood sample or other biological sample packages and containers, and any other packages or containers of various articles.

Exemplary food packages include packages of dairy products and/or containers for storage or transportation of dairy products.

Other exemplary articles include milk storage and processing devices such as, but not limited to, containers, storage tanks, raw milk holding equipment, dairy processing operations conveyer belts, tube walls, gaskets, rubber seals, stainless steel coupons, piping systems, filling machine, silo tanks, heat exchangers, post-pasteurization equipment, pumps, valves, separators, and spray devices.

In some embodiments, the article is an energy harvesting device, for example, a microelectronic device, a microelectromechanic device, a photovoltaic device and the like.

In some embodiments, the article is a microfluidic device, for example, micropumps or micro valves and the like.

In some embodiments, the article includes a sealing part, for example, O rings, and the like.

In some embodiments, the article is, for example, article having a corrosivable surface.

In some embodiments, the article is an agricultural device.

In some embodiments, the article is made of textile, for example, tough cottons.

In some embodiments, the article is fuel transportation device.

In some embodiments, the article is a construction element, such as, but not limited to, paints, walls, windows, door handles, and the like.

In some embodiments, the article is an element is water treatment systems (such as for containing and/or transporting and/or treating aqueous media or water), devices, containers, filters, tubes, solutions and gases and the like.

In some embodiments, the article is an element in organic waste treatment systems (such as for containing and/or disposing and/or transporting and/or treating organic waste), devices, containers, filters, tubes, solutions and gases and the likes.

In some embodiments, the article is selected from: pacemakers, endoscope components, dental surgery devices, veterinary surgery devices, hemodialysis tubing or equipment, blood exchanging and transfusion devices, bandages, ophthalmic devices, wound dressings, breast implants, pacemakers, replacement joints, catheter access ports, dialysis tubing, shunts, screw plates, artificial spinal disc replacements, internal implantable defibrillators, cardiac resynchronization therapy devices, implantable cardiac monitors, mitral valve ring repair devices, left ventricular assist devices (LVADs), and the like.

The Process:

According to an aspect of some embodiments of the present invention there is provided a process of preparing composition-of-matter comprising a hollow mineral tube having deposited (also termed hereinthroughout: "loaded" or "applied") on at least one surface thereof one or more essential oils (EOs), the process comprising depositing the EOs on the hollow mineral tube by applying a deposition route selected from: plating, chemical bath deposition (CBD), spin coating, chemical vapor deposition (CVD), ultrasonic irradiation, thereby obtaining the composition-of-matter.

In some embodiments, the incorporating process is affected by factor selected from: pressure, solvent of the medium, pH, ionic strength of the medium, agitation method and intensity, and temperature. In some embodiments, the loading procedure may be perceived as a sequence of recurring steps, in which case the optimal number of repetitions may be identified.

In some embodiments, earlier, chemical modifications of hollow mineral tube lumen are effective for enhancing affinity of the loaded substance to the tube lumen, resulting in improved loading and controlling release rate of the loaded specie of the EOs from the hollow mineral tube.

In some embodiments, chemical etching can significantly enlarge the hollow mineral tube lumen, leading to greatly increased loaded amounts.

The loading of the EOs within the hollow tube can be characterized by any method known in the art.

In some embodiments, the preparation process is affected by ultrasonic irradiation as described herein under "Sonochemically-prepared compositions-of-matter".

In some embodiments, the ultrasonic irradiation is applied by subjecting a mixture of one or more essential oils (EOs) being in contact with the hollow mineral tube to ultrasonic irradiation.

In some embodiments, the process further comprises a sequential step of incorporating the hollow tube/EOs hybrids in/on a substrate as described herein.

In some embodiments, the molar ratio of the hollow mineral tube and the EOs ranges from 4:1 to 1:4. In exemplary embodiments, the molar ratio is about 1:2.

The substrate's surfaces as described herein can further be modified by various chemical and mechanical processes, including, for example, SAMs, PVD, lithography and plasma etching.

In some embodiments, the process further comprises contacting a substrate or a portion thereof with the hollow mineral tube to thereby fabricate a substrate, so as to incorporate a plurality of hollow mineral tubes in and/or on at least a portion of the substrate (the product denoted herein as "substrate/(hollow tube/EOs hybrids)").

In some embodiments, the contacting is affected by melt-compounding the substrate or a portion thereof with the hollow mineral tube.

The terms "melt-compounding" or "meld-blending" refer to a process in which at least one molten polymeric component is intimately mixed with at least one other component (e.g., hollow tube/OEs hybrid) at the processing temperature; the term "processing temperature" refers to the temperature at which melt compounding is carried out, for example, temperature of 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., 490° C., or 500° C., including any value therebetween. In some embodiments, the meld-blending is performed in an extruder.

In some embodiments, the hollow tube (e.g., Halloysite) particles are incorporated into fibres.

In exemplary procedures, the incorporation of the hollow tube into fibres is employed the melt spinning process. Typically, melt spinning is used for polymers that can be melted. The polymer solidifies by cooling after being extruded from the spinneret.

In some embodiments, process parameters of the melt-spinning such as draw ratio and thermosetting temperature may be varied.

For a continuous and stable melt spinning process, the selection of the right spin filter is a key factor. Typically, the service life of the used filters should be high to guarantee a continuous and stable melt spinning process. Furthermore, different spin filters can be used.

Exemplary parameters of interest include, but are not limited to, the degree of filter fineness, polymer mass flow and pressure build-up in relation to time during the polymer extrusion.

In some embodiments, the EO is maintained in the composition-of-matter at a temperature up to at least 500° C. In some embodiments, the EO is maintained in the composition-of-matter at a temperature up to at least 400° C. In some embodiments, the EO is maintained in the composition-of-matter at a temperature up to at least 300° C. By "EO is maintained" it is meant that at least e.g., 70%, 80%, 90%, 99.9% of the EO(s) molecules remains adsorbed to the substrate (film), following the melt-compounding process and/or having less than e.g., 70%, 60%, 50%, 30%, 25%, 20%, or 10% evaporation of the EOs.

In some embodiments, the EOs are sustained-release from the composition-of-matter. By "sustained-release" it is meant to refer to the hollow tube vehicle (carrier) that releases the volatile EO moiety at a slower rate as compared to a substrate not comprising the vehicle, as defined by the methodology in the Example section hereinbelow.

In some embodiments, there is provided a composition-of-matter comprising a hollow mineral tube having deposited on at least one surface thereof one or more essential oils (EOs), produced by an embodiment of the disclosed process.

Antimicrobial Applications:

According to another aspect of some embodiments of the present invention, there is provided a method of inhibiting or reducing or retarding the formation of load of a microorganism and/or the formation of a biofilm, in and/or on an article. The method comprises incorporating in and/or on the article any one of the compositions-of-matter as described herein, including any of the respective embodiments thereof.

Herein "antimicrobial activity" is referred to as an ability to inhibit (prevent), reduce or retard bacterial growth, fungal growth, biofilm formation or eradicate living bacterial cells, or their spores, or fungal cells or viruses in a suspension, on a surface or in a moist environment.

Herein, inhibiting or reducing or retarding the formation of load of a microorganism refers to inhibiting reducing or retarding growth of microorganisms and/or eradicating a portion or all of an existing population of microorganisms.

Thus, the composition-of matter comprising one or more EOs as described herein can be used both in reducing the formation of microorganisms on or in an article, and in killing microorganisms in or on an article or a living tissue.

In some embodiments, the one or more EOs act in synergy. In some embodiments, the one or more EOs act in synergy when incorporated within the halloysite.

The term "synergy" and any grammatical derivative thereof, as used herein, describe a cooperative action encountered in combinations of two or more biologically active compounds in which the combined effect exhibited by the two or more compounds when used together exceeds the sum of the effect of each of the compounds when used alone. "Synergy" is therefore often determined when a value representing an effect of a combination of two or more EOs is greater than the sum of the same values obtained for each of these agents when acting alone.

Exemplary definitions and quantifications of the synergistic effect are described in the Example section below.

Exemplary OEs that may act in synergy are carvacrol and thymol, e.g., in a weight ratio of from 4:1 to 1:4 (e.g., about 1:1).

The microorganism can be, for example, a unicellular microorganism (prokaryotes, archaea, bacteria, eukaryotes, protists, fungi (e.g., *A. alternate*), algae, *euglena*, protozoan, dinoflagellates, apicomplexa, trypanosomes, amoebae and the likes), or a multicellular microorganism. As used herein, the terms "bacteria", or "bacterial cells" may refer to either Gram-positive bacteria (e.g., *L. innocua*) and/or to Gram-negative bacteria (e.g., *E. coli*) and archae, including pathogenic and multi-drug resistant (MDR) bacteria.

In some embodiments of the present invention the composition-of-matter in any embodiment as described herein-throughout, may be characterized by high affinity to a specified bacteria type, species, or genus. Therefore, in some embodiments of the present invention the composition-of-matter in any embodiment as described hereinthroughout, may be used an effective way for selectively targeting bacteria.

Herein "anti-biofouling activity" or "antifouling activity" is referred to as an ability to inhibit (prevent), reduce or retard biofilm formation on a substrate's surface.

The term "biofilm", as used herein, refers to an aggregate of living cells which are stuck to each other and/or immobilized onto a surface as colonies. The cells are frequently embedded within a self-secreted matrix of extracellular polymeric substance (EPS), also referred to as "slime", which is a polymeric sticky mixture of nucleic acids, proteins and polysaccharides.

In the context of the present embodiments, the living cells forming a biofilm can be cells of a unicellular microorganism (prokaryotes, archaea, bacteria, eukaryotes, protists, fungi, algae, *euglena*, protozoan, dinoflagellates, apicomplexa, trypanosomes, amoebae and the likes), or cells of multicellular organisms in which case the biofilm can be regarded as a colony of cells (like in the case of the unicellular organisms) or as a lower form of a tissue.

In the context of the present embodiments, the cells are of microorganism origins, and the biofilm is a biofilm of microorganisms, such as bacteria and fungi. The cells of a microorganism growing in a biofilm are physiologically distinct from cells in the "planktonic form" of the same organism, which by contrast, are single-cells that may float or swim in a liquid medium. Biofilms can go through several life-cycle steps which include initial attachment, irreversible attachment, one or more maturation stages, and dispersion. The phrases "anti-biofilm formation activity" refers to the capacity of a substance to effect the prevention of formation of a biofilm of bacterial, fungal and/or other cells; and/or to effect a reduction in the rate of buildup of a biofilm of bacterial, fungal and/or other cells, on a surface of a substrate. In some embodiments, the biofilm is formed of bacterial cells.

In some embodiments, a biofilm is formed of bacterial cells of bacteria selected from the group consisting of all Gram-positive and Gram-negative bacteria and archae.

As demonstrated hereinbelow, a composition of matter as described herein has shown to exhibit anti-biofilm formation (ABF) activity and can thus prevent, retard or reduce the formation of a mass of a biofilm.

In some embodiments of the present invention, the activity of preventing or reducing the formation of a biofilm, may be achieved by a substrate or an article incorporating the composition-of matter of the present invention (e.g., substrate/(hollow tube/EOs hybrid)).

The inhibition or reduction or retardation of formation of a biofilm assumes that the biofilm has not yet been formed, and hence the presence of the composition-of matter of the present invention is required also in cases where no biofilm is present or detected.

As used herein, the term "preventing" in the context of the formation of a biofilm, indicates that the formation of a biofilm is essentially nullified or is reduced by e.g., at least 20%, at least 30%, at least 40%, at least 50%, at least 60%, at least 70%, at least 80%, at least 90%, including any value therebetween, of the appearance of the biofilm in a comparable situation lacking the presence of the composition-of matter of the present invention or an article containing same. Alternatively, preventing means a reduction to e.g., at least 15%, 10% or 5% of the appearance of the biofilm in a comparable situation, lacking the presence of the composition-of matter of the present invention or an article containing same. Methods for determining a level of appearance of a biofilm are known in the art.

As used herein, the term "preventing" in the context of antimicrobial, indicates that the growth rate of the microorganism cells is essentially nullified or is reduced by at least 20%, at least 30%, at least 40%, at least 50%, at least 60%, at least 70%, at least 80%, at least 90%, including any value therebetween, of the appearance of the microorganism in a comparable situation lacking the presence of the composition-of matter of the invention or an article containing same. Alternatively, preventing means a reduction to at least 15%, 10% or 5% of the appearance of the microorganism cells in a comparable situation lacking the presence of composition-of matter of the invention or an article containing same. Methods for determining a level of appearance of a microorganism cells are known in the art.

In some embodiments, at least 90% of antimicrobial activity of the composition-of matter of the present invention is maintained for at least e.g., 1 day, 2 days, 5 days, 10 days, 15 days, 20 days, 25 days, 30, days 35 days, 40 days, 45 days, 50 days, 55 days, 60 days of storage duration.

In some embodiments, the one or more EOs have anti-inflammatory, antiseptic and/or antioxidant activity, or combination of thereof.

Table 1 hereinbelow presents exemplary EOs that are conceivable in the context of the present disclosure, vis-à-vis their physical and biological properties: boiling point, biological function and their corresponding chemical structure.

TABLE 1

| Active Ingredient | Boiling Point | Function | Chemical Structure |
|---|---|---|---|
| Almond (Benzaldehyde) | 180° C. | Antimicrobial | |
| Carvacrol | 237° C. | Antimicrobial Antiseptic | |
| Cinnamaldehyde | 248° C. | Antimicrobial | |
| Citral | 229° C. | Antimicrobial | |

TABLE 1-continued

| Active Ingredient | Boiling Point | Function | Chemical Structure |
|---|---|---|---|
| Citronellol | 225° C. | Antimicrobial Anti-inflammatory | |
| Geraniol | 230° C. | Antimicrobial Anti-inflammatory | |
| Eugenol | 254° C. | Antimicrobial Anti-inflammatory | |
| Linalool | 197° C. | Antimicrobial | |
| Octyl gallate | >300° C. | Antioxidant, Preservative | |
| Tea tree | 165° C. | Antimicrobial Antiseptic Antioxidant | Monocyclic terpene compounds |
| Thymol | 232° C. | Antimicrobial | |

Articles of manufacturing usable in the context of these embodiments include any of the articles described hereinabove.

For example, articles of manufacturing in which prevention of biofilm formation are of high importance are usable in the context of these embodiments of the present invention.

Such articles include, but are not limited to, milk production and processing devices, medical devices, packages and containers, agricultural devices, construction elements, water treatment systems and elements thereof, and organic waste treatment systems and elements thereof.

According to some embodiments of the present invention, the composition presented herein is packaged in a packaging material and identified in print, in or on the packaging material, for use in reducing or preventing the formation of a biofilm and/or disrupting a biofilm in or on a substrate, as described herein.

Alternatively, the compositions-of-matter as described herein can be incorporated within any of the articles of manufacturing described herein, during manufacture of the article of manufacturing.

According to an aspect of some embodiments of the present invention, there is provided a composition-of-matter as described herein, which is identified for use in manufacturing an article containing the substrate of the composition of matter.

In some embodiments, such a composition is identified for use in manufacturing articles which are characterized as capable of reducing, inhibiting and/or retarding biofilm formation, and growth of a pathogenic microorganism as described herein.

General:

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples which, together with the above descriptions, illustrate the invention in a non-limiting fashion.

Example 1

Sample Preparation

Materials:

Halloysite Nanotubes (HNTs) were supplied by Natural-Nano (USA) and were characterized by a tubular form with an external diameter typically smaller than 100 nm, internal diameter of 20 nm and length of 500-1200 nm. Low-density polyethylene (LDPE), Ipethene 320, was supplied by Carmel Olefins Ltd. (Haifa, Israel) with melt flow rate of 2 g/10 min. Carvacrol (98%), Bacto agar, Nutrient Broth (NB) medium, Tryptic Soy Broth (TSB), Potato Dextrose Agar, Triton X-100 were purchased from Sigma Aldrich (Israel). NB bacto-agar was purchased from Becton Dickinson (USA).

Sample Preparation:

Preparation of HNTs/Carvacrol Hybrids:

Halloysite Nanotubes/carvacrol hybrids, denoted hereinthroughout as: "HNTs/carvacrol", were prepared by shear mixing carvacrol with HNTs at a weight ratio of 2:1 (respectively) follow by ultrasonication. Ultrasonication was performed at room temperature for 20 min at constant amplitude of 40% by using Vibra cell VCX 750 instrument (Sonics & Materials Inc., USA) to achieve a uniform HNTs/carvacrol dispersion.

A scheme demonstrating the preparation route system is presented in FIG. 1.

Preparation of LDPE-Based Films:

Low-density polyethylene was melt-compounded with HNTs/carvacrol hybrids using a 16 mm twin-screw extruder (Prism, England) L/D ratio of 25:1 with a screw speed of 150 rpm and feeding rate of 2 kg/h at 140° C. Following the melt-compounding process, 150 μm thick films are prepared by compression molding at 140° C.

Table 2 below presents specific compositions of the different blends.

Hereinthroughout, "LDPE/HNTs/carvacrol" denotes HNTs used as conventional filler and are dry blended with carvacrol following compounding with LDPE. That is, the pre-compounding step, in which the HNTs/carvacrol hybrid is prepared, is not performed.

TABLE 2

| Sample | LDPE (wt %) | HNTs (wt %) | Carvacrol (wt %) |
|---|---|---|---|
| Neat LDPE | 100 | 0 | 0 |
| LDPE/HNTs | 98 | 2 | 0 |
| LDPE/carvacrol | 96 | 0 | 4 |
| LDPE/HNTs/carvacrol | 94 | 2 | 4 |
| LDPE/(HNTs/carvacrol hybrid) | 94 | (2/4)(HNTs/carvacrol) | |

Preparation of Polyamide/(HNTs/carvacrol) films: Polyamide 6 (PA) was melt-compounded with HNTs/carvacrol hybrids using a 16 mm twin-screw extruder (Prism, England) L/D ratio of 25:1 with a screw speed of 150 rpm and feeding rate of 2 kg h$^{-1}$ at 250° C. Table 3 specifies the composition of the different film blends investigated. Following the melt-compounding process, ~50 μm thick films were prepared by cast extrusion using 45 mm screw diameter extruder (Dr. Collin, Germany) at 250° C.

TABLE 3

| | Composition (wt %) | | |
|---|---|---|---|
| Sample | PA | HNTs | Carvacrol |
| Neat PA | 100 | 0 | 0 |
| PA/carvacrol | 98 | 0 | 2 |
| PA/(HNTs/2% carvacrol) | 97 | 1 | 2 |
| PA/(HNTs/4% carvacrol) | 94 | 2 | 4 |

Example 2

Sample Characterization

Material and Methods

Thermogravimetric Analysis (TGA):

Hybrids were characterized by thermal gravimetric analysis (TGA) using TGA-Q5000 system (TA instruments, USA) at a heating rate of 20° C./min under nitrogen atmosphere, starting at room temperature up to 600° C.

The release of carvacrol from the LDPE-based films was investigated by isothermal gravimetric analysis using TGA Q5000 system at a constant temperature of 60° C. under nitrogen atmosphere for duration of about 10 h, until the mass of the film became steady. Several methods have been reported to characterize the diffusion of active agents and other additives in polymer substrates [Crank, J., The mathematics of diffusion. Oxford Univ. 1975, 414].

In the present invention, the diffusion coefficient was derived from the initial linear slope of the fractional mass release ratio vs. $t^{1/2}$, according to the following equation:

$$\frac{m_t}{m_\infty} = 4\left(\frac{Dt}{\pi l^2}\right)^{\frac{1}{2}}$$

where $m_t$ and $m_\infty$ are the amounts of additive (carvacrol) released from the film at time t and at equilibrium t=∞, respectively. D (m²/s) is the diffusion coefficient and l is the thickness of the film.

Electron Microscopy. Transmission Electron Microscopy (TEM) and High-Resolution Scanning Electron Microscopy (HRSEM) measurements: In exemplary procedures, the nanostructure of neat HNTs and films was studied using a Carl Zeiss Ultra Plus HRSEM operated at 1 keV accelerating voltage. Films were cryogenically fractured in liquid nitrogen prior to observation.

Experimental Results

Figure 2B:
FIGS. 2A-B present high-resolution scanning electron microscope (HR-SEM) images of neat HNTs at two different magnitude scales: 1 µm (FIG. 2A) and 500 nm (FIG. 2B).
Figure 2A:
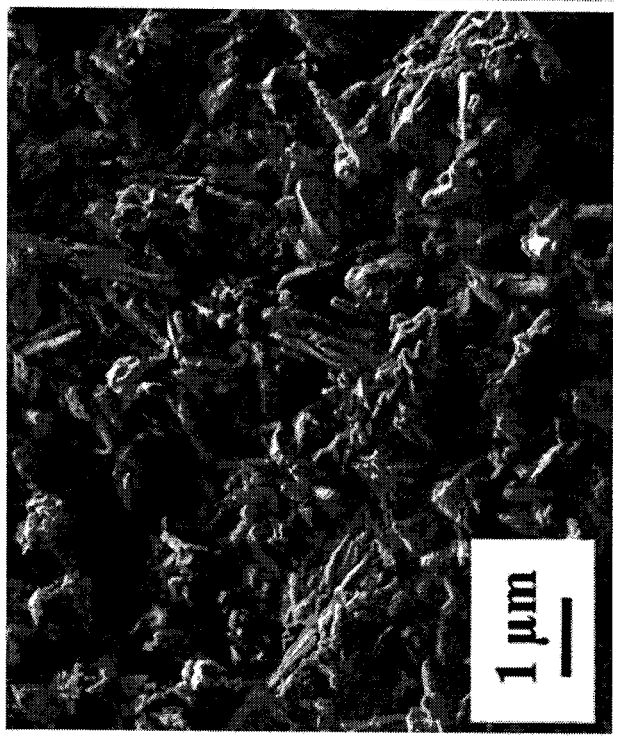

Electron Microscopy Measurements
HRSEM Measurements:
Neat HNT:

FIG. 2 depicts the morphology of the neat HNTs, showing that the particles have a typical cylindrical shape. Some of the particles are observed to be hollow and open-ended. The length of the HNTs is non-uniform and varies significantly from 0.2 to 2 µm.

Figures 3A, 3B:
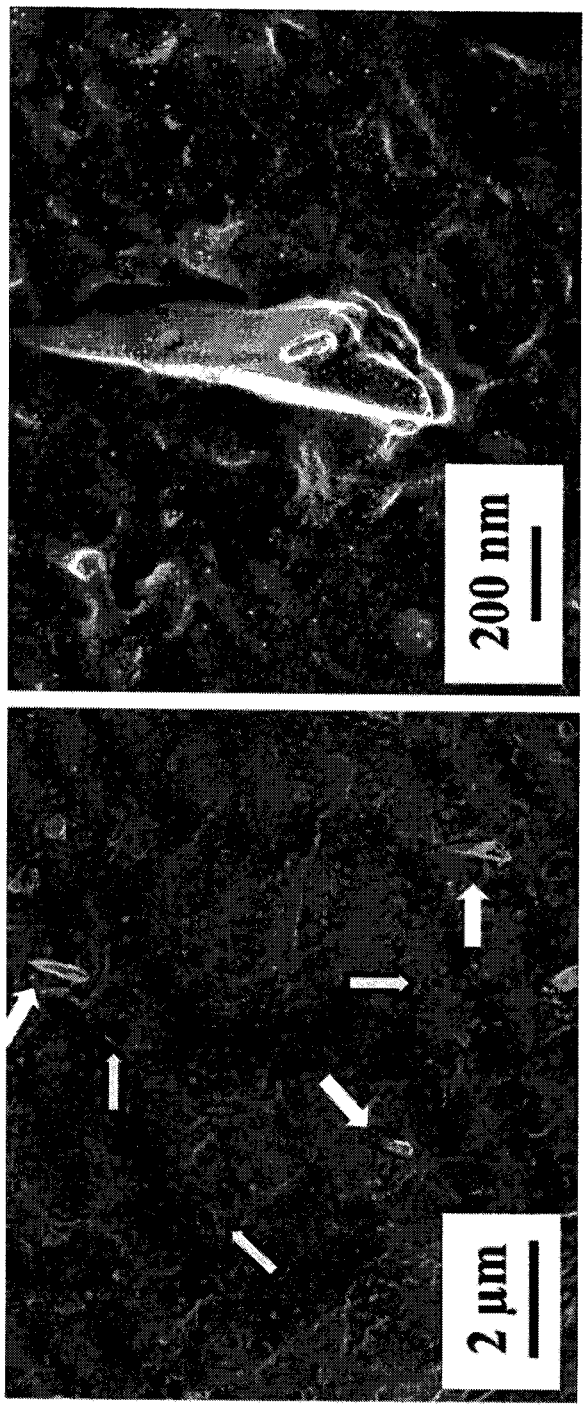
FIGS. 3A-C present electron microscopy images: HR-SEM images of a cold fracture low-density polyethylene (LDPE)/(HNTs/carvacrol hybrid) films at two different magnitude scales: 2 µm (FIG. 3A; white arrows marking tubes protruding from the surface, and black arrows marking empty circular holes left after some of the tubes were pulled out during fracturing) and 200 nm (FIG. 3B).

LDPE/(HNTs/Carvacrol Hybrid):

FIG. 3 displays micrographs of cryogenic cross-sectioned LDPE/(HNTs/carvacrol hybrid) films. The HNTs appear to be individually dispersed within the LDPE matrix (FIG. 3A). Some of the tubes are observed to protrude from the surface (marked with white arrows), while some were pulled out during fracturing, leaving behind empty circular holes (marked with black arrows). Higher-magnification image (FIG. 3B) allows observing the interface region between the polymer and HNTs. The adhesion between the nanotubes and the polymer is rather poor, demonstrated by the gaps between the individual nanotubes and the matrix.

Figure 3C:
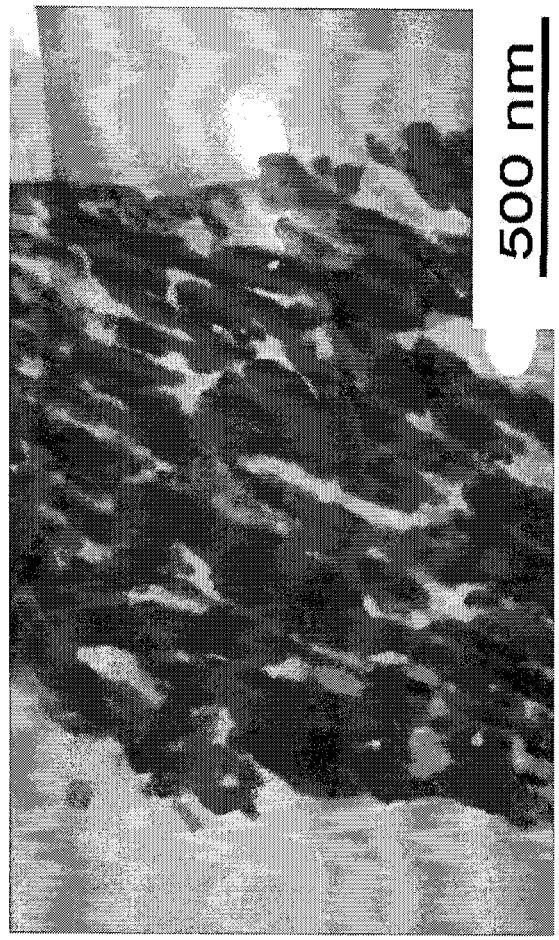

Tem Measurements:

FIG. 3C shows a transmission electron micrograph of HNTs and HNPs finely dispersed within a polymer matrix. The high level of dispersion is tailored appropriate Halloysite external surface modification. The image also shows the orientation of the HNTs within the polymer.

Figure 4:
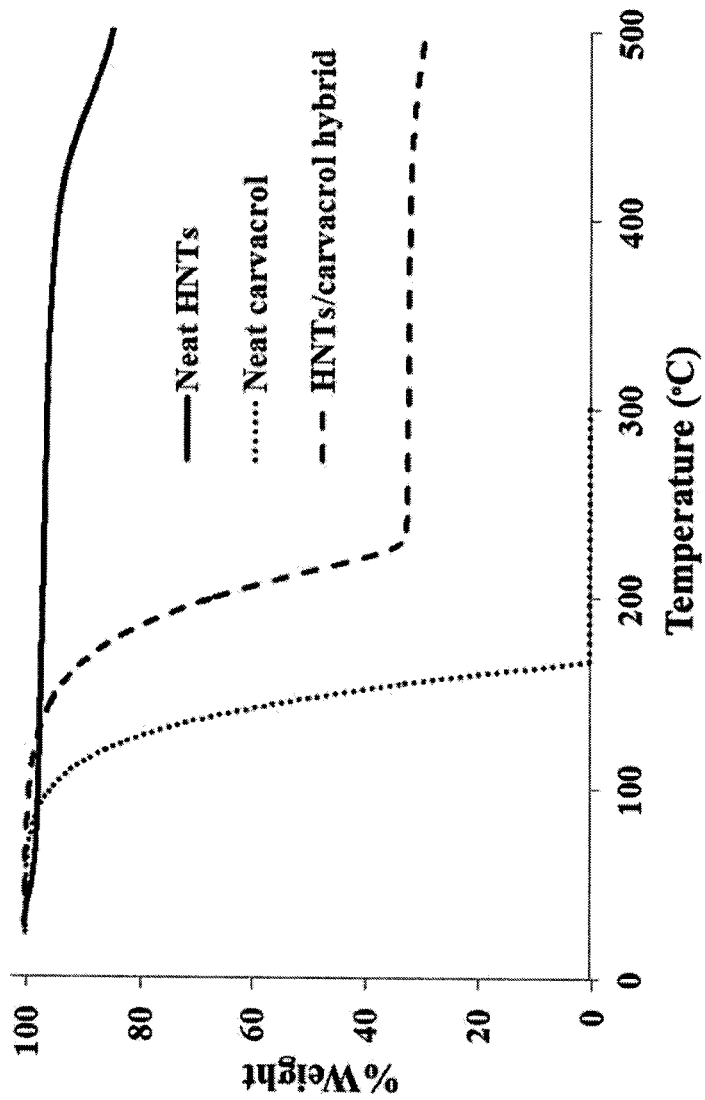
FIG. 4 presents thermal gravimetric analysis (TGA) curves of neat HNTs, carvacrol and the HNTs/carvacrol hybrid.

TGA Measurements:
HNTs/Carvacrol Hybrid:

FIG. 4 shows the characterization of the resulting HNTs/carvacrol hybrids by thermal gravimetric analysis (TGA) compared to neat carvacrol. The thermogram for the neat carvacrol displays one distinct weight loss process, ascribed for carvacrol evaporation, which is completed at about 165° C. For the HNTs/carvacrol hybrid, carvacrol loss occurs at significantly higher temperature of about 220° C. Using the thermograms the inorganic content within the hybrid can be calculated to be 33 wt %, corresponding to the initial HNTs content in the dispersion, which indicates that the resulting hybrids are uniform in their composition.

Importantly, the TGA results demonstrate that the HNTs significantly enhance the thermal stability of the volatile carvacrol molecules, ascribed to the successful carvacrol loading mainly into the lumen and partially onto the external surface of the nanotubes.

Therefore, these loaded HNTs may function as "active" carriers for carvacrol to allow its incorporation into polymers via high-temperature melt compounding processes. These results suggest that in the case of HNTs/carvacrol hybrids, the cylindrical nanostructure allows the carvacrol molecules to enter the lumens of the HNTs (as schematically illustrated in FIG. 1), delaying mass transport, and significantly improving their thermal stability.

LDPE-Based Films:

Table 4 below summarizes the carvacrol and HNTs content in different films (following melt compounding and processing) determined by TGA (initial carvacrol content, pre-processing, was 4 wt % and initial HNTs content was 2 wt %).

TABLE 4

| Film | Carvacrol content (wt %) | HNTs content (wt %) |
| --- | --- | --- |
| LDPE/HNTs | 0 ± 0.1 | 1.7 ± 0.1 |
| LDPE/carvacrol | 1.8 ± 0.1 | 0 ± 0.1 |
| LDPE/HNTs/carvacrol | 2.1 ± 0.1 | 1.7 ± 0.1 |
| LDPE/HNTs/carvacrol hybrid) | 3.1 ± 0.1 | 1.7 ± 0.1 |

The inorganic residues, following heating to 600° C., are attributed to the HNTs content within the LDPE-based films. The neat HNTs contain about 83 wt % inorganic content, as determined by TGA (as shown in FIG. 4). Accordingly, for all relevant films, HNTs contents of 1.7 wt % are obtained, as shown in Table 4. These results are consistent with the inorganic content determined for neat HNTs, suggesting that the nanotubes are uniformly distributed within the LDPE matrix.

The carvacrol content in the LDPE/carvacrol films is 1.8 wt %, indicating that more than half of initial carvacrol concentration is lost during the high-temperature processing steps. The LDPE/HNTs/carvacrol films contain a slightly higher carvacrol content of 2.1 wt %, demonstrating that addition of HNTs, as conventional filler, is not sufficient to preserve the volatile carvacrol molecules during the high-temperature processes. In contrast, the LDPE/(HNTs/carvacrol hybrid) films contain a significantly higher carvacrol content of 3.1 wt %, validating that 80 wt % of the volatile carvacrol molecules were maintained within the film. Furthermore, FTIR measurements performed to verify and quantify the carvacrol content within the films show similar results.

Accordingly, without being bound by any particular theory or mechanism, these results show that the HNTs/carvacrol hybrid has a profound role in retaining the highly volatile molecules within the polymer during processing at elevated temperatures, which is in agreement with the enhanced thermal stability observed for the HNTs/carvacrol hybrids.

Thus, without being bound by any particular theory or mechanism, it can be hypothesized that the HNTs particles in the hybrid serve as encapsulating "active" carriers, protecting the carvacrol, and allowing its preservation during high-temperature compounding processes.

Figure 5A:
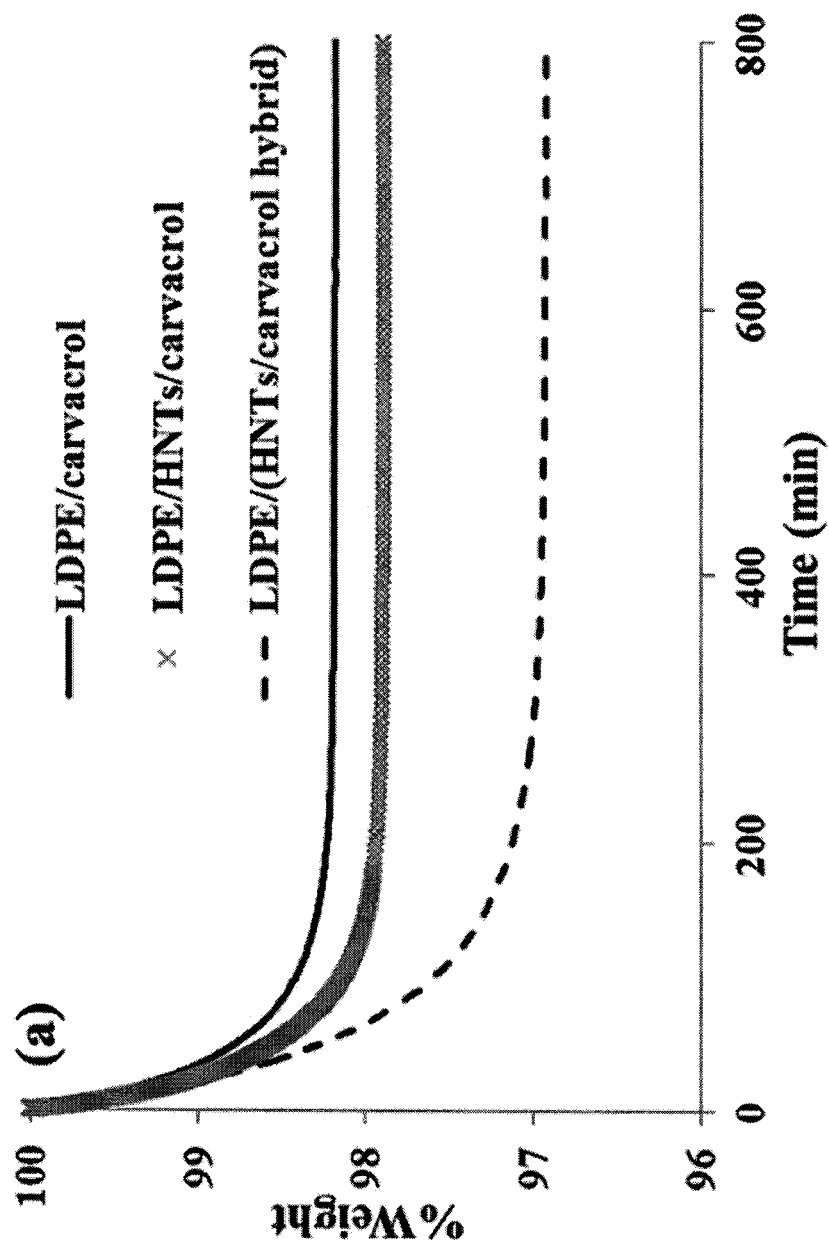
FIGS. 5A-B present isothermal thermograms at 60° C., depicting carvacrol release vs. time from the three different carvacrol-containing films, according to the methodology described in the Examples section hereinbelow: LDPE/carvacrol, LDPE/HNTs/carvacrol and LDPE/(HNTs/carvacrol hybrid) (FIG. 5A) and Plot of $m^t/m_\infty$ (fractional mass loss ratio) vs. $t^{1/2}$ for the three different carvacrol-containing films (FIG. 5B).
Figure 5B:
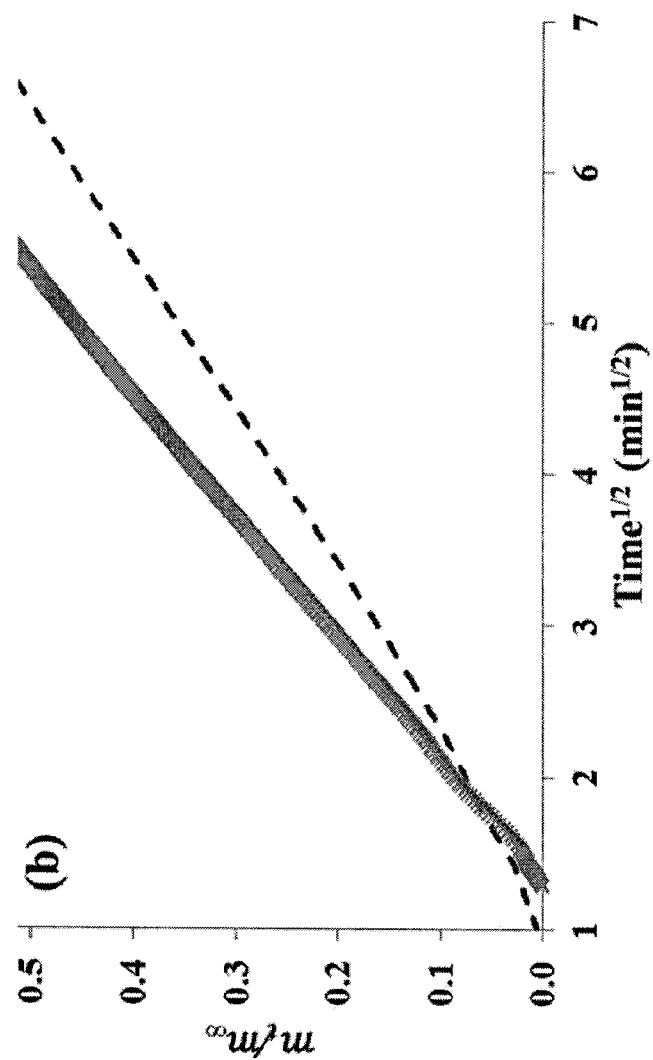

Release of Carvacrol from the LDPE-Based Films:

The effect of HNTs on the release of antimicrobial agent (i.e. carvacrol) from the films is demonstrated in FIG. 5A showing the isothermal thermograms (at 60° C. to accelerate release) of the three different carvacrol-containing films: LDPE/carvacrol, LDPE/HNTs/carvacrol and LDPE/(HNTs/carvacrol hybrid). The observed weight loss as function of time is attributed to the release of volatile carvacrol moiety (also confirmed by gas chromatography). As described hereinabove, the data of FIG. 5A is used to calculate the diffusion coefficient by plotting the fractional mass loss ratio vs. $t^{1/2}$, according to the equation described hereinabove. The diffusion coefficient is determined from the initial linear slope of FIG. 5B.

For the LDPE/carvacrol film, carvacrol content is observed to diminish, i.e. the film attains a constant mass value, more rapidly in comparison to the other systems. LDPE/HNTs/carvacrol films were observed to retain a slightly higher carvacrol content than the LDPE/carvacrol film (Table 4); however, a similar profile of carvacrol release is observed, as demonstrated in FIG. 5B. Indeed, both systems have similar calculated diffusion coefficient values of $6.83 \times 10^{-11}$ and $6.65 \times 10^{-1}$ $m^2/s$, respectively. This result indicates that addition of HNTs as a conventional filler has a negligible effect on the carvacrol release rate from the films.

On the contrary, for the LDPE/(HNTs/carvacrol hybrid) films a diffusion coefficient of $4.22 \times 10^{-1}$ $m^2/s$ is calculated. Thus, the slower out-diffusion kinetics of carvacrol from the LDPE/(HNTs/carvacrol hybrid) nanocomposite is attributed to the effective role of HNTs as nano-carriers, hindering the release of confined carvacrol molecules.

Characterization of PA/(HNTs/Carvacrol) Films

Carvacrol-containing films were produced at different compositions (Table 3) by melt-compounding of HNTs/carvacrol hybrid (and neat carvacrol for comparison) with polyamide 6 (PA) at 250° C. using a twin-screw extruder. Following the compounding steps, films were produced by cast extrusion at 250° C. FIG. 6 presents images of the resulting films. For the PA/carvacrol system, it was impossible to produce extruded films (FIG. 6A) due to the boiling and subsequent evaporation of the volatile carvacrol molecules (boiling point of carvacrol is 236° C.) within cast extruder. The resulting ruptured films depicted large holes and a "fishnet" structure, making unsuitable for usage. On the contrary, when HNTs/carvacrol hybrids were used, film production by cast extrusion was feasible and high-quality transparent films were obtained, as shown in FIG. 6B.

TGA Measurements of PA/(HNTs/Carvacrol) Films

The resulting films were studied by thermal gravimetric analysis (TGA) in order to examine the effect of the HNTs carriers on the residual carvacrol content following the harsh high-temperature melt-compounding and processing of PA. Table 5 summarizes the results of these experiments showing carvacrol content in different carvacrol-containing films, determined by TGA.

Initial carvacrol content, pre-processing, was 2 and 4 wt % respectively. Films based on HNTs/carvacrol hybrids retained approximately 90% of the initial carvacrol content; while for the control PA/carvacrol system, no residual carvacrol was detected. Thus, showing that carvacrol was completely evaporated during the high-temperature processing steps. These results show that the HNTs/carvacrol hybrid is crucial for both, film production and retaining the highly volatile molecules within the PA matrix during processing at elevated temperatures.

Further characterization of the carvacrol-containing systems included only hybrid-based films, due to the unacceptable properties of the PA/carvacrol "fishnet film" for any packaging application.

TABLE 5

| Film sample | Carvacrol content (wt %)* |
|---|---|
| PA/carvacrol | 0 ± 0.1 |
| PA/(HNTs/2% carvacrol) | 1.9 ± 0.1 |
| PA/(HNTs/4% carvacrol) | 3.5 ± 0.1 |

*Values are mean ± standard deviation

HRSEM Measurements of PA/(HNTs/Carvacrol) Films:

The nanostructure of the films was characterized by HRSEM. FIG. 7 displays micrographs of neat HNTs and cryogenic cross-sectioned PA/(HNTs/2% carvacrol) films.

Figures 7A, 7B, 7C:
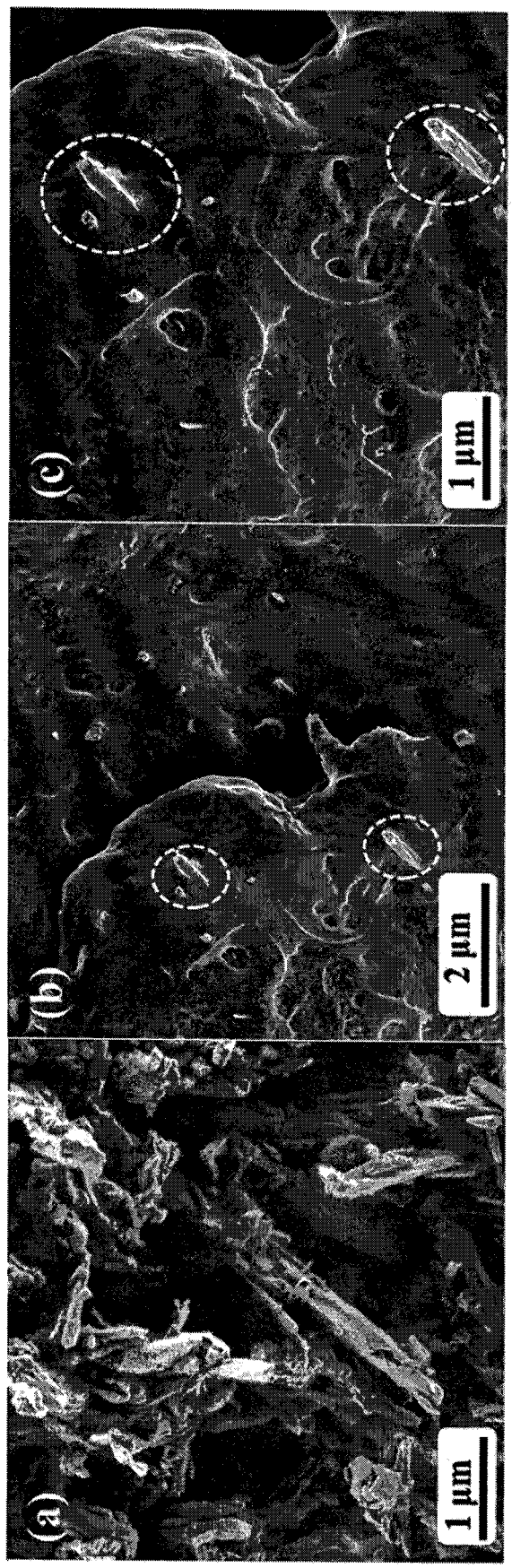
FIGS. 7A-C present HRSEM images of neat HNTs (FIG. 7A) of cryogenic cross-sectioned PA/(HNTs/2% carvacrol) films at two different magnifications (FIGS. B, and C). Few HNTs are circled and marked for clarity.

FIG. 7A presents the neat HNTs, where the particles have a typical cylindrical shape with an external diameter of ~50 nm, and internal diameter of 10-20 nm. The length of the HNTs is non-uniform and varies significantly from 0.2 to 2 μm. The HNTs appear to be individually dispersed within the PA matrix (FIG. 7B). Higher-magnification image (FIG. 7C) allows observing the interface region between the polymer and HNTs. The interactions between the nanotubes and the polymer are demonstrated by the fine adhesion between the individual nanotubes and the matrix.

Example 3

Antimicrobial Activity

Materials and Experimental Methods

Antibacterial Activity:

In order to assess the biofunctionality of the carvacrol retained in the films post processing, the antibacterial activity of the different films was characterized by incubating the films with bacterial (e.g., *E. coli*) suspensions ($10^8$ CFU/ml, for 24 h, at 37° C.) after which viable cell counts and log reductions were calculated in comparison to growth of the bacterial cells exposed to the control film.

In exemplary procedures, the antibacterial activity of the different films was evaluated by inhibition of *Escherichia coli* (*E. coli*, ATCC 8739) growth in liquid media. A loop full of *E. coli* stored at −80° C. was cultured overnight in 3 ml nutrient broth (NB) medium at 37° C. under agitation (250 rpm). In the following day, the culture diluted in fresh NB medium and incubated for an additional ~1.5 h, allowing the cells to enter their logarithmic stage. As the culture reached an optical density value of 0.6, it was diluted by 1:100 with 1% NB to obtain a bacterial stock solution at a concentration of $10^5$ CFU (colony forming unit)/mL. Antibacterial activity tests were performed in 24-well plates where a film sample (disks of 1.2 cm diameter) was placed in a well together with 1 mL of the *E. coli* stock solution. The plates were incubated at 37° C. under continuous agitation (100 rpm) for 24 h. Incubation was followed by serial dilutions with in 1:100 NB (performed in 96-well plates). Viable cell counts were assessed by the drop-plate technique; 20 µL drops were incorporates into NB bacto-agar in 9 cm Petri plates. Plates were incubated at 37° C. for 24 h; CFU are counted and log reduction was calculated in comparison to *E. coli* cultured in NB 1:100 medium ($10^8$ CFU/mL), use as a control. All measurements, including the growth controls were performed in triplicates.

Antibiofilm Activity

The potential of the various LDPE films containing carvacrol to inhibit biofilm formation was evaluated using the Gram-positive *Listeria innocua* (ATCC 33090), as the model microorganism. *Listeria innocua* is a Gram-positive bacterium and an appropriate indicator for the pathogenic *Listeria monocytogenes* [Liu, S. et al., *International Journal of Food Science & Technology* 2009, 44 (1), 29-35]. As described hereinabove, a biofilm is a multicellular layer of adherent bacteria surrounded by a matrix of extracellular polysaccharides, which has the potential to act as a chronic source of microbial contamination, leading to significant health hazards [Oulahal, N., et al. *Food Control* 2008, 19 (2), 178-185]. Thus, *Listeria innocua* was selected owing to its ability form true, three-dimensional biofilms under static conditions.

In exemplary experiments, bacteria were grown overnight in tryptic soy broth (TSB) growth medium. In the following day, bacterial cells were diluted in TSB to obtain a stock solution with an optical density value at 595 nm ($OD_{595}$) of 0.3 (corresponding to about $3\times10^8$ CFU/mL). 1 mL from the stock solution was taken into each well in a 24-well plate. Each of the different films (discs of 1 cm in diameter) was added to the well. The plates were then incubated at 25° C. under gentle agitation (100 rpm) for 20 h. In the day after, the films rinsed 3 times with distilled water to remove the unattached bacteria (i.e. planktonic cells) and subsequently the attached cells were scraped from the films using 250 µL of Tris-HCl (0.1 M, pH 7.2) and cell scrapers. 200 µL out of the 250 µL, use for scrapping the cells, were transferred into the first line of a 96-well plate, while the rest of the lines were filled with 180 µL of Tris-HCl (0.1 M, pH 7.2). Serial dilutions were carried out and the cells spotted onto NB agar plates, which were then incubated at 37° C. for 20 h. Cell growth was monitored and determined by a viable cell count. The experiments were conducted in triplicates, with internal duplicates.

Antifungal Activity

The phytopathogenic and clinical fungus *Alternaria alternata* (*A. alternata*), originating from the surface of tomato and cultured on 1% potato dextrose agar (PDA: 10 g/L; bacto-agar: 11 g/L in 1000 mL of deionized water), was utilized as a model fungus for the purpose of the study. Antifungal activity was characterized using direct contact and indirect volatility assays as follows:

(i) Direct contact assay: A modified ISO 16869:2008 protocol was used. The ISO protocol was modified by employing 1% PDA instead of Nutrient Salt Agar. Discs (area of about 7.1 $cm^2$) were removed with a manual puncher from film samples and placed onto 1% PDA that served as base agar layer, in the center of 9 cm Petri plates. Fungal conidial suspension was prepared by harvesting conidia from 5 days old cultures with sterilized deionized water containing 0.01% w/w of Triton X-100. The spore suspension was adjusted with the aid of a hemocytometer and was then transferred into soft agar (pre-solidified 1% PDA cooled to 45° C.), producing an inoculum suspension within the soft agar at a final conidial concentration of $10^5$ conidia/mL. The inoculum was poured over the film disc and the base agar layer, covering the specimen with a thin layer of inoculum. The Petri plates were left at room temperature for 1 h to allow the inoculum layer to solidify. Then, the plates were sealed with Para-Film and incubated at 25° C. in the dark for 7 days. Neat LDPE films were used as negative controls. Following incubation, the antifungal activity of the films was quantified with the aid of an optical stereomicroscope (Axio Scope.A1; Carl Zeiss, Oberkochen, Germany) using a non-parametric ordinal scale, as follows:

4=Very High (VH) activity—no fungal growth; 3=High (H) activity—limited mycelial growth; 2=Moderate (M) activity—mycelial growth present with sporulation covering up to 10% of the tested sample; 1=Low (L) activity—mycelial growth present with sporulation covering up to 30% of the tested sample; and 0=No activity (none)—severe fungal sporulation.

All tests were carried out in triplicates and the antifungal efficacy of the tested films is reported as the median of the three replications.

(ii) Headspace assay: Agar plugs (3×3 mm) were removed from the growing edges of a 5 days old *A. alternata* culture and placed in the center of the Petri dish onto 1% PDA. Film samples (area of about 25 $cm^2$) for evaluations were attached with a double-sided masking tape to the center of the Petri plates' lids without direct contact between the film and the agar or the fungus that is growing on it. The plates are tightly sealed with Para-Film and are incubated inverted for 10 days at 25° C. The diameter of the growing colonies is monitored and recorded.

Fresh Produce Storage:

In exemplary experiments, films were modified into 0.15× 0.30 m bags. All bags were macro-perforated to eliminate the possibility of modified atmosphere development during storage, assuring that only antimicrobial potency (induced by carvacrol release) effect on decay was evaluated. Storage experiments were conducted in a split-plot design with repeated measures with the different studied films (Table 5) and 9 to 20 replications (Table 6). Cherry tomatoes, lychee and table grapes were used as model fresh produce items, see Table 6, showing fresh produce storage experiments conditions. Decay incidence was recorded over time and the amount of decay was quantified using the area under the decay progress curve (AUDPC), which was calculated using Equation (2):

$$AUDPC = Sum\left[\frac{(Y_i + Y_{i+1})}{2}\right] \times (t_{i+1} - t_i) \quad (2)$$

where $Y_i$ and $Y_{i+1}$ are the levels of decay at time $t_i$ and $t_{i+1}$, respectively. Percent decay reduction was calculated in relation to the mean AUDPC of the neat PA control film using Equation (3):

[Mean AUDPC (neat PA)]−[Mean AUDPC (active film)]*100[Mean AUDPC (neat PA)] (3)

TABLE 6

| Fresh produce type | Weight (kg) | Number of replications | Storage conditions | | |
|---|---|---|---|---|---|
| | | | Temperature (° C.) | Time (days) | Humidity (%) |
| Cherry tomatoes | 0.1 | 20 | 10 | 51 | 90 |
| Lychee | 0.5 | 16 | 4 | 29 | 90 |
| Table grapes | 0.25-0.3 | 9 | 1 | 38 | 90 |

Carvacrol Residue Analysis in Fresh Produce:

Carvacrol content within fresh produce (cherry tomato, lychee and grape) was analyzed following 10 days of storage by gas chromatography-mass spectrometry (Agilent GC-MS 7890 system, USA). Fruit tissues (0.07 kg) were extracted twice with 150 mL MTBE containing 10 µg of iso-butyl benzene as an internal standard. During the extraction, the samples were vigorously shaken for 18 h at room temperature. The MTBE extracts were combined and concentrated to a volume of 1 mL under a gentle stream of nitrogen and dried through a column containing sodium sulfate. Carvacrol calibration curve was constructed by linear regression of the peak area and concentration ratio of using 8 standard dilutions (with 2 replicates) at the range of 0-1000 µg mL$^{-1}$. The identification of carvacrol was performed by comparing its relative retention index and mass spectra with that of an authentic standard and supplemented with NIST 98 and QuadLib 2205 GC-MS libraries. A mixture of straight-chain alkanes (C7-C23) was injected into the column under the same conditions for retention indices calculation.

Results

Figure 8:
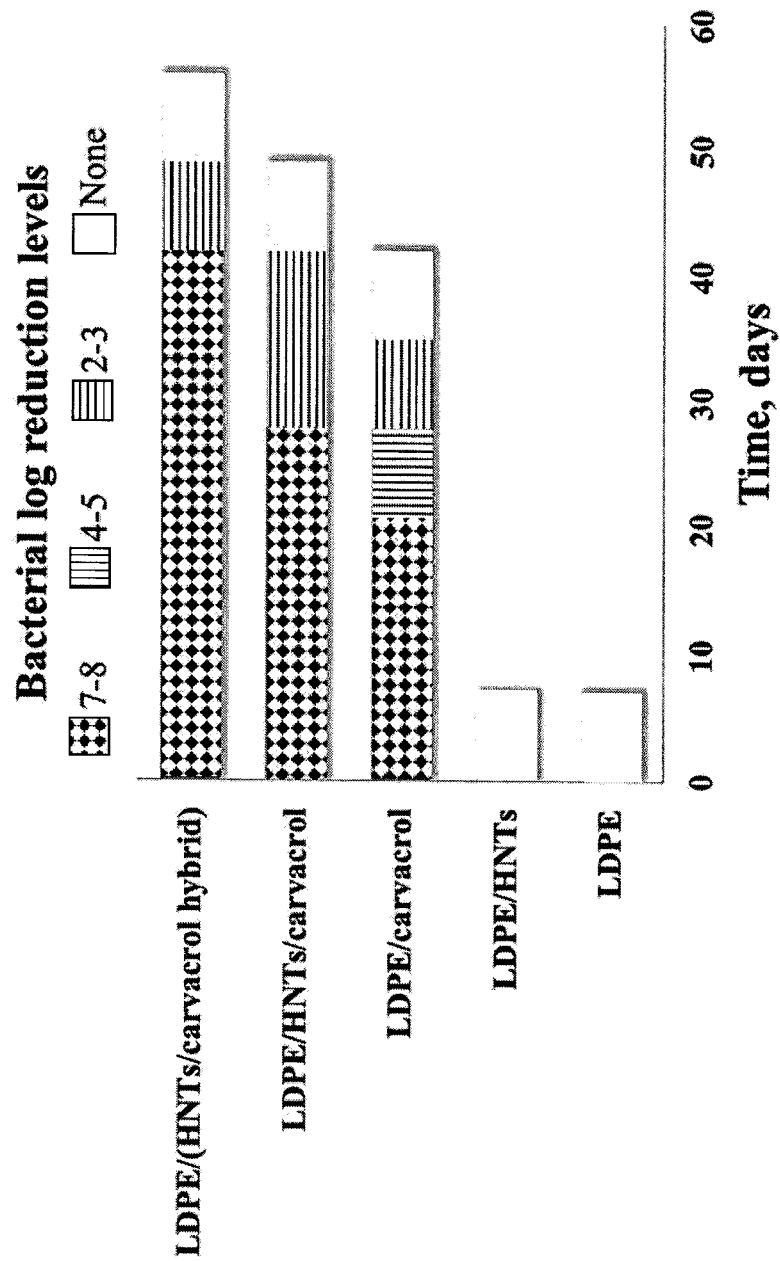
FIG. 8 presents a bar graph presenting the antibacterial activity against *E. coli* bacteria of neat LDPE, LDPE/HNTs, LDPE/carvacrol, LDPE/HNTs/carvacrol and LDPE/(HNTs/carvacrol hybrid) films as function of storage time at room temperature (LDPE: low-density polyethylene).

Antibacterial Activity:

As shown in FIG. 8, both reference films, without carvacrol, have no antibacterial activity, while films comprising carvacrol reduced E. coli cell counts to undetectable levels, demonstrating a durable bactericidal efficacy of carvacrol within the films.

The experiments were carried out periodically to evaluate the effect of storage duration at room temperature on the antimicrobial efficacy of the, thus, replicating industrial systems where bulk materials are kept stored in the factory or in an external storing facility until used.

Nevertheless, storage time has a profound effect on the antibacterial potency of the films. LDPE/carvacrol films lose their efficacy within three weeks of production, while LDPE/HNTs/carvacrol films preserve their bactericidal efficacy for an additional week. In contrast, the longest bactericidal efficacy was recorded for LDPE/(HNTs/carvacrol hybrid) films, exhibiting activity for up to six weeks, after which its performance decayed. These results are consistent with both the effective carvacrol content as shown in Table 2 hereinabove, and its out-diffusion kinetics, as demonstrated in FIGS. 9A-D.

Antibiofilm Activity:

Table 7 below summarizes the Listeria innocua biofilm viability on the different films, as determined by viable count measurements. Both control films, neat LDPE and LDPE/HNTs, show insignificant effect on the biofilm viability. In contrast, the LDPE/carvacrol film managed to reduce the viability by 1 log, and the LDPE/HNTs/carvacrol and LDPE/(HNTs/carvacrol hybrid) films exhibited enhanced antibiofilm efficacy, with 2.2 and 3.2 log reductions, respectively.

These results confirm that the LDPE/(HNTs/carvacrol hybrid) film has the best antibiofilm activity against Listeria innocua, and that it is superior to all films tested in this regards.

TABLE 7

| Film | Log reduction by viable cell count |
|---|---|
| LDPE | None |
| LDPE/HNT | None |
| LDPE/carvacrol | 1.0 ± 0.3 |
| LDPE/HNTs/carvacrol | 2.2 ± 0.3 |
| LDPE/(HNTs/carvacrol hybrid) | 3.2 ± 0.3 |

Antifungal Activity.

(i) Direct Contact Assay:

As described hereinabove, to test the antifungal properties of the films, a direct and indirect contact tests were used. Table 8 hereinbelow summarizes the results of the in vitro studies conducted with A. alternata, indicating the ability of the studied films to sustain antifungal activity following the high-temperature melt compounding and processing.

TABLE 8

| Film | Antifungal activity |
|---|---|
| LDPE | 0 = None |
| LDPE/carvacrol | 1 = Low |
| LDPE/HNTs/carvacrol | 2 = Moderate |
| LDPE/(HNTs/carvacrol hybrid) | 4 = Very High |

Additionally, FIGS. 9A-D depict images of the different LDPE-based films after 7 days exposure to A. alternata.

Figures 9A, 9B, 9C, 9D:
FIGS. 9A-D present images demonstrating the effect of direct contact assay for: neat LDPE (FIG. 9A); LDPE/carvacrol (FIG. 9B); LDPE/HNTs/carvacrol and (FIG. 9C) LDPE/(HNTs/carvacrol hybrid) (FIG. 9D) films on the development of *A. alternata* following 7 days of incubation at 25° C. in the dark. Conidial suspensions were mixed in pre-solidified agar and poured over the tested film. The film margins are marked for clarity.

For the neat LDPE film, substantial and homogenous fungal growth was observed to occur all over the Petri dish (FIG. 9A). In contrast, incubation of the fungus with LDPE/(HNTs/carvacrol hybrid) films resulted in a complete eradication of the fungus (FIG. 9D). In the case of LDPE/carvacrol system, no fungal growth is observed above the film disk and less dense growth can be seen throughout the dish (FIG. 9B).

The LDPE/HNTs/carvacrol films exhibited a similar growth pattern; however, a pronounced pigment change of the fungal conidia from the common brown-black to light brown-yellow was observed (FIG. 9C). The dark pigment in A. alternata conidia is an outcome of melanin accumulation, which shields the conidia from the harmful effect of UV irradiation. Durrell L. W. [Mycopathologia et mycologia applicata 1964, 23 (4), 339-345] indicated that conidia lacking melanin were eradicated by UV light exposure of four minutes or less. Thus, exposure of the fungi to this film affected the durability and survivability of A. alternata.

Figures 10A, 10B, 10C, 10D:
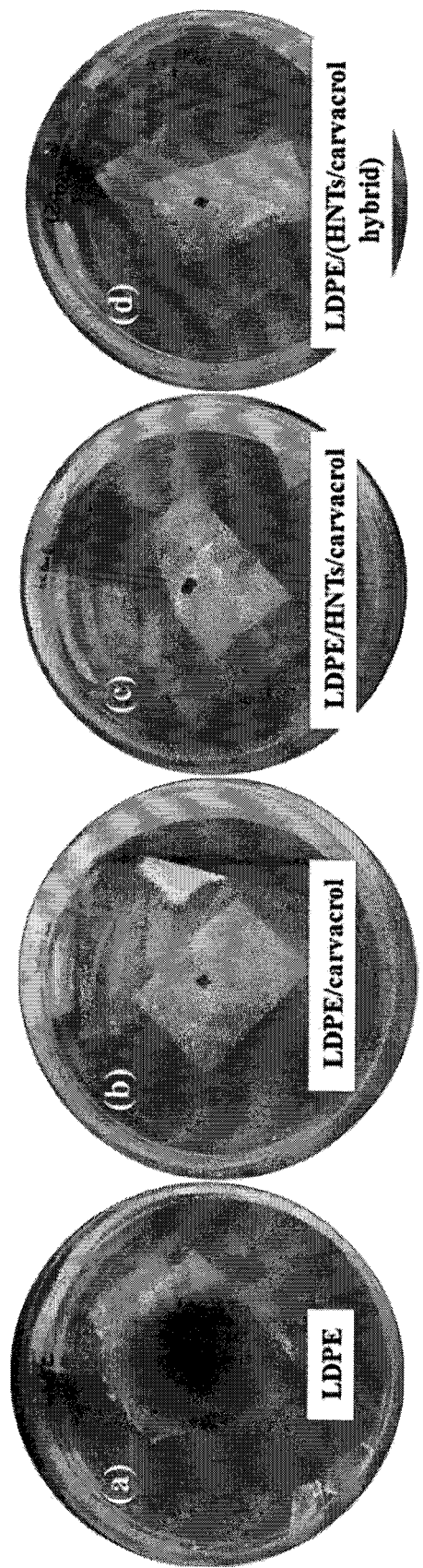
FIGS. 10A-D present images demonstrating the effect of indirect headspace assay for: neat LDPE (FIG. 10A); LDPE/carvacrol (FIG. 10B); LDPE/HNTs/carvacrol and (FIG. 10C) LDPE/(HNTs/carvacrol hybrid) (FIG. 10D) films on the development of *A. alternata* following 10 days of incubation at 25° C. in the dark. Agar plugs (3×3 mm) were removed from the growing edges of 5 days old *A. alternata* colonies and placed in the center of the Petri dish.

(ii) Headspace Assay:

To further explore the role of carvacrol activity against A. alternata, headspace assays in which the films were not in direct contact with the fungus were conducted. In these studies, all carvacrol-containing films exhibited a similar behavior of full inhibition of A. alternata growth (FIG. 10B-D); while for neat LDPE films the fungus was able to proliferate and form a healthy colony, as shown in FIG. 10A. It should be noted that in the headspace assay the film area to fungus ratio is higher in comparison to the direct contact test, providing higher effective carvacrol concentration.

These two test methods simulate packaged food scenarios during storage or freight, in which the food is in both direct and indirect contact with the packaging material. Thus, demonstrating the high efficacy of the LDPE/(HNTs/carvacrol hybrid) films to manage mold development on packaged food. These results are consistent with both antibacterial and antibiofilm properties of the studied films, emphasizing the critical role of carvacrol encapsulation in the HNTs carriers, which in turn hinder the substantial carvacrol loss during processing and delay its out-diffusion from the nanocomposite films.

In Vitro Antifungal Activity of PA/(HNTs/Carvacrol) Films:

In order to assess the functionality of the carvacrol retained in the films post processing, the antifungal efficacy of the different films was confirmed in vitro at both contact and non-contact headspace tests. The direct contact assay performed with the postharvest model fungi *A. alternata*, *P. expansum* and *A. niger*. Results for the carvacrol-containing films are presented in Table 9, showing in vitro antifungal contact activity of the studied films following 21 days of incubation at 25° C. in darkness. Both PA/(HNTs/2% carvacrol) and PA/(HNTs/4% carvacrol) films exhibited high effectivity in inhibiting hyphal growth as well as fungal sporulation. In vitro headspace studies of the films employed four common and relevant postharvest molds: *A. alternata*, *B. cinerea*, *P. digitatum* and *A. niger*.

Table 10 summarizes the results of colony growth rates and percent growth rate reduction of four postharvest molds that were exposed to different tested films in headspace assay in terms of colony growth rate and growth rate reduction for the different postharvest molds. For the PA/(HNTs/2% carvacrol) films, the hyphal growth rates were observed to significantly decrease for *A. alternata* and *B. cinerea* (74% and 80%, respectively), while for *P. digitatum* and *A. niger*, a moderate effect was detected (49% and 23%, respectively). When film with higher carvacrol content was used, PA/(HNTs/4% carvacrol), high efficacy was demonstrated for all molds (>75% decrease in growth rate).

Figure 11:
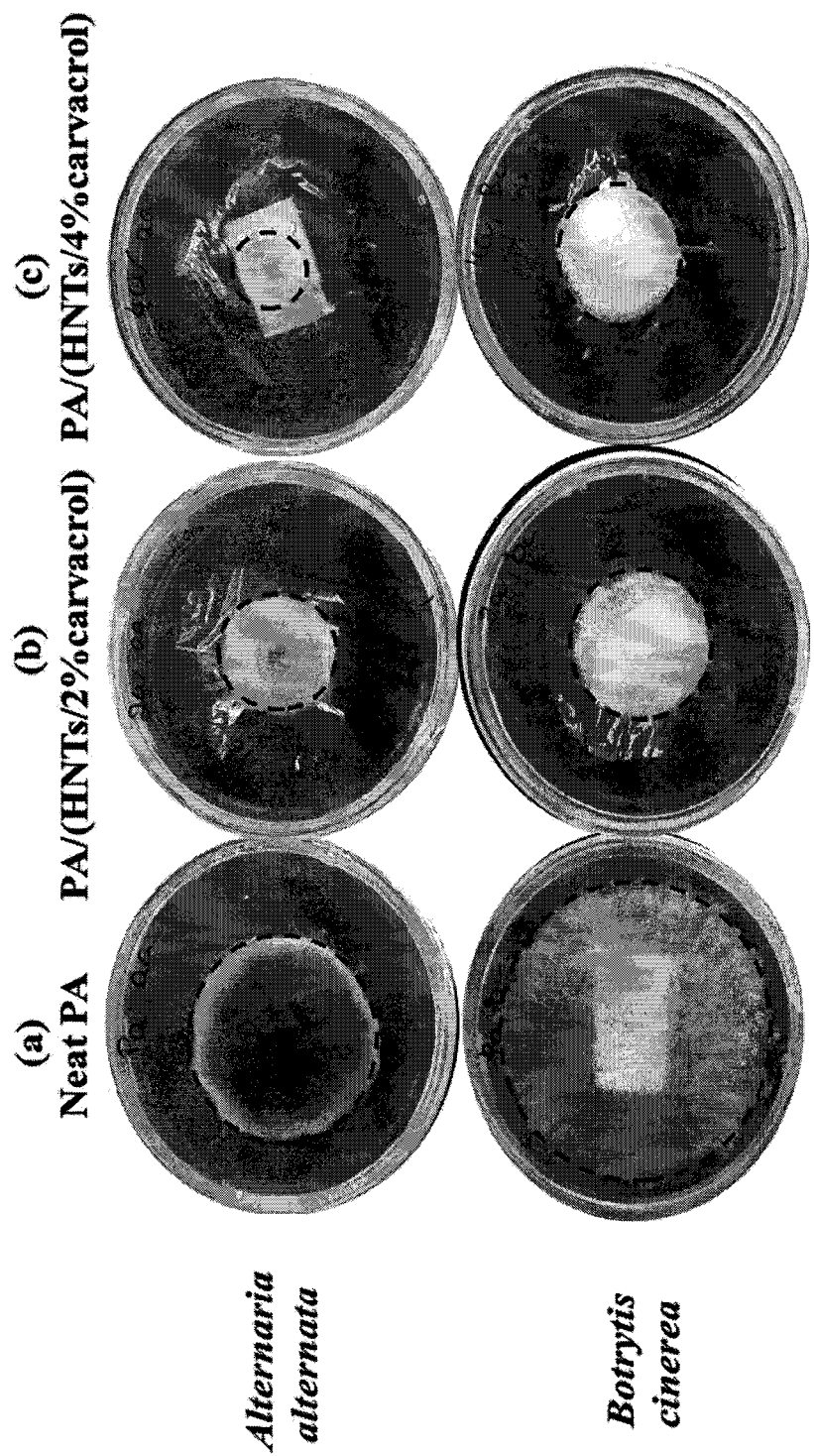
FIG. 11 presents characteristic images of in vitro headspace assay for neat PA (a; left panel) PA/(HNTs/2% carvacrol) (b; middle panel) and PA/(HNTs/4% carvacrol) films (c; right panel) on the development of *A. alternate* and *B. cinerea* following 135 h of incubation at 25° C. in the dark. Fungal colony margins are marked for clarity.

FIG. 11 shows characteristic images of in vitro studies with *A. alternata* and *B. cinerea* molds, clearly demonstrating the fungal reduced development under the effect of different studied films in the headspace assay.

TABLE 9

| Film | Antifungal Index | Activity |
|---|---|---|
| Neat PA | 0-1 | None-Low |
| PA/(HNTs/2% carvacrol) | 3 | High |
| PA/(HNTs/4% carvacrol) | 3 | High |

Tested films were placed onto nutrient salt agar in Petri plates and were spray-inoculated with a $10^4$ CFU $mL^{-1}$ inoculum of the postharvest molds *A. alternata*, *P. expansum* and *A. niger*.

Figure 12A:
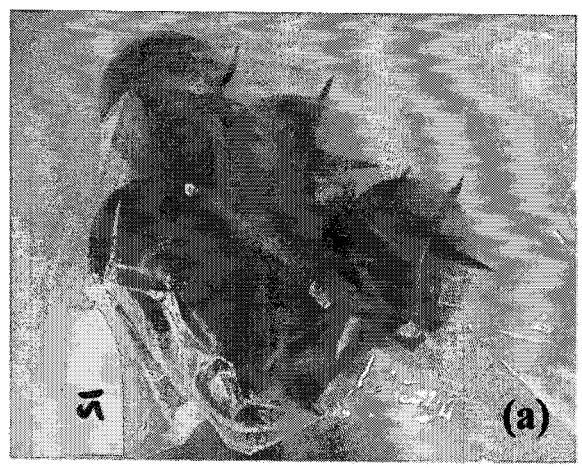
FIGS. 12A-C presents Cherry tomatoes images from fresh produce storage trial: Fresh tomatoes packed in film at the beginning of the trial (FIG. 12A); Tomatoes packed in neat PA film following 51 days of storage at 10° C./90% Relative humidity (RH) (FIG. 12B). Tomatoes packed in PA/(HNTs/2% carvacrol) film following 51 days of storage at 10° C./90% RH (FIG. 12C). The fungal decay developed on the fruit is marked by black arrows for clarity.
Figure 12B:
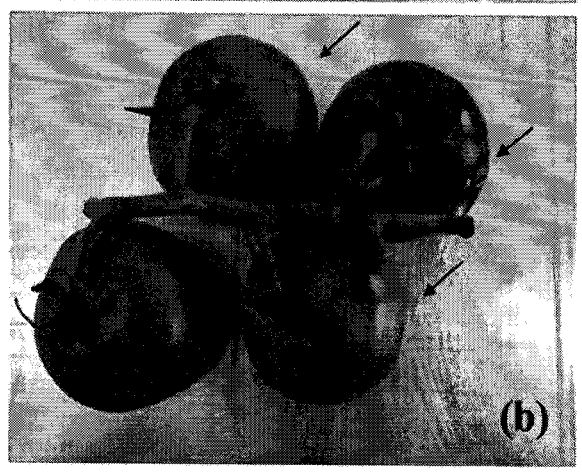
Figure 12C:
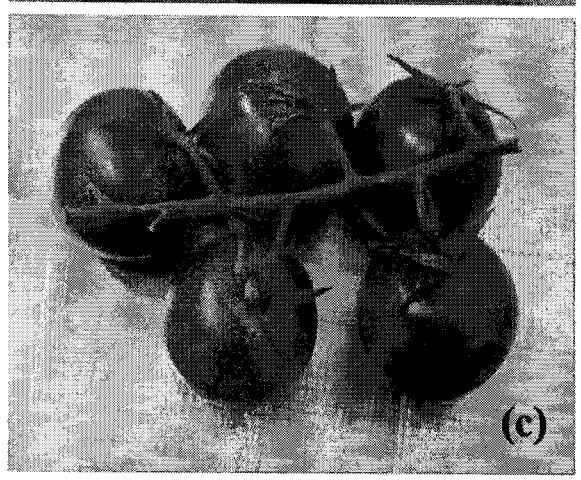

6 which summarizes the specific details of each storage experiment). Table 11 presents the results, in terms of decay reduction of the fresh produce, obtained after packaging within the studied films. Significant decay reduction of 50% was attained for cherry tomatoes packaging with PA/(HNTs/2% carvacrol) film. Images of packed cherry tomatoes before and after 51 days of storage are shown in FIGS. 12A-C. Fungal decay developed on cherry tomatoes, which were packed in neat PA film, are clearly observed (FIG. 12B). Packaging cherry tomatoes in PA/(HNTs/2% carvacrol) film resulted in higher quality due to inhibition of fungal growth (FIG. 12C). On the other hand, when using a higher concentration of carvacrol within the film (PA/(HNTs/4% carvacrol)) an increased decay was observed (with values of 58-100%), indicating a phytotoxic effect associated with tissue sensitivity. For lychee and grape packaging, the PA/(HNTs/2% carvacrol) film reduced decay by 17% and 25%, respectively. Similar results were obtained in the presence of higher carvacrol content (as shown in Table 11 showing decay reduction for cherry tomatoes, lychee and grapes packed in studied films after 51, 29 and 38 days of storage at 10° C., 4° C. and 1° C., respectively, with 90% RH in the storing chamber).

Carvacrol residue in fruit tissue following 10 days of packaging was analyzed by -MS and the results are presented in Table 12 showing carvacrol residue in fruit tissue following 10 days of packed fresh produce storage. Storage temperatures were 10° C., 4° C. and 1° C. for the cherry tomatoes, lychee and grapes, respectively, with 90% RH in the storing chamber. Carvacrol residues were detected in all the studied fruits supporting the observed decay reduction results (as shown Table 11). The later may be ascribed to the presence of carvacrol, which is a strong antifungal compound, in both the fruit tissue and skin. Nevertheless, carvacrol levels in the fruits were recorded at relatively high levels (g $g^{-1}$), which may cause organoleptic changes. The food industry prohibits organoleptic changes in packaged food as stated in the Framework Regulation EC 1935/2004. Therefore, while the presence of carvacrol in the packaging proved highly effective in managing decay development, our active packaging requires additional adjustments to meet these requirements.

TABLE 10

Colony growth rate ($mm^2$ $h^{-1}$) and growth rate reduction (%) [x]

| | *A. alternata* | | *B. cinerea* | | *P. digitatum* | | *A. niger* | |
|---|---|---|---|---|---|---|---|---|
| Film | Growth rate ($mm^2$ $h^{-1}$) | Growth rate reduction (%) [z] | Growth rate ($mm^2$ $h^{-1}$) | Growth rate reduction (%) [z] | Growth rate ($mm^2$ $h^{-1}$) | Growth rate reduction (%) [z] | Growth rate ($mm^2$ $h^{-1}$) | Growth rate reduction (%) [z] |
| Neat PA | 10.6 (0.9) [y] | — | 30.9 (0.95) | — | 10.0 (0.76) | — | 4.3 (0.9) | — |
| PA/(HNTs/2% carvacrol) | 2.8 (0.84) | 74 | 6.3 (0.9) | 80 | 5.1 (0.8) | 49 | 3.3 (0.8) | 23 |
| PA/(HNTs/4% carvacrol) | 1.2 (0.78) | 89 | 5.3 (0.9) | 83 | 2.4 (0.8) | 76 | 0.94 (0.75) | 78 |

[x] Cultures were incubated for 135 h at 25° C. Colony radius was recorded and colony area calculated each day. Growth rate was calculated with linear regression by plotting colony area ($mm^2$) on time (h).
[y] Values in parentheses are coefficients of determination ($R^2$) of the linear regression.
[z] Growth rate reduction was calculated in relation to the growth rate of the neat PA film used as control.

Fresh Produce Storage Analysis:

The antifungal efficacy of the carvacrol-containing films was further studied under conditions of in vivo storage, mimicking realistic scenarios of food packaging. The studied films were used for the packaging of fresh produce: cherry tomatoes, lychee and table grapes (as shown in Table The presented active packaging technology shows great potential to serve as protective decay control strategy, hampering the polycyclic nature of postharvest decay causing molds, such as *Penicillium* spp., *Alternaria* spp., *Rhizopus* spp. or *Aspergillus* spp. during postharvest storage or freight, hence reducing postharvest wastage.

TABLE 11

| Film | Fresh produce decay reduction (%) | | | |
|---|---|---|---|---|
| | Tomato trial 1 | Tomato trial 2 | Lychee trial | Grape trial |
| Neat PA | 0 | 0 | 0 | 0 |
| PA/(HNTs/2% carvacrol) | −33 | −50 | −17 | −25 |
| PA/(HNTs/4% carvacrol) | +100 | +58 | −15 | −27 |

Decay reduction (%) was calculated relation to the area under the decay progress curve (AUDPC) of the neat PA control film. A '−' sign before a value represents decay reduction, whereas a '+' sign represents decay increase.

TABLE 12

| Film | Carvacrol residue in fresh tissue ($\mu g\ g^{-1}$) | | |
|---|---|---|---|
| | Tomato | Lychee | Grape |
| Neat PA | 0 ± 0.1 | 0 ± 0.1 | 0 ± 0.1 |
| PA/(HNTs/2% carvacrol) | 10.8 ± 0.1 | 2.0 ± 0.1 | 2.4 ± 0.1 |
| PA/(HNTs/4% carvacrol) | 18.2 ± 0.1 | 7.0 ± 0.1 | 4.2 ± 0.1 |

Values are mean ± standard deviation

Example 4

Compositions Having Synergistic Activity

Antimicrobial Susceptibility to Pure Carvacrol, Thymol and their Combinations Assay:

Bacterial susceptibility to pure carvacrol, thymol and their mixtures was characterized by the standard chequerboard procedure for antimicrobial susceptibility for combination of antimicrobials (Franzot & Casadevall, 1997; Pei, Zhou, Ji, & Xu, 2009).

Accordingly, in exemplary procedures, stock aqueous emulsions of thymol and carvacrol (at a concentration of 6400 mg $L^{-1}$ in MillyQ water, 18.2 mΩ-cm) are prepared by ultrasonication (Vibra cell VCX 750, Sonics & Materials Inc., USA) for 3 min at a constant amplitude of 40%, on ice bath using small amounts of Tween-80. Serial dilutions of the carvacrol and thymol stock suspensions are prepared in a 96-well plate in LB medium at a concentration range of 0-400 mg $L^{-1}$ and 0-300 mg $L^{-1}$ for carvacrol (CV) and thymol (TY), respectively. E. coli culture in a logarithmic stage is added to each well and the volume is adjusted with LB medium to a constant value of 200 µL, while the initial $OD_{600}$ value is maintained at 0.2. Control wells are similarly prepared (on the same plate) to include fresh LB medium instead of E. coli culture. The plate is sealed with SealPlate® (Excel Scientific Inc., Victorville, CV, US) incubated at 37° C. for 4 h under gentle shacking in a microplate reader (Varioskan Flash, Thermo Scientific, USA). Absorbance measurements are recorded at 600 nm every 3 min.

The summed fractional inhibitory concentration (FIC) index (Lambert, Skandamis, Coote, & Nychas, 2001) of CV and TY in a mixture is defined as the sum of individual FIC indices of CV and TY:

$$\sum FIC = FIC_{CV} + FIC_{TY} = \frac{C_{CV}}{MIC_{CV}} + \frac{C_{TY}}{MIC_{TY}}$$

where $C_{CV}$ and $C_{TY}$ are the concentrations of CV and TY in the mixture that produces a minimal inhibitory effect, and $MIC_{CV}$ and $MIC_{TY}$ are the corresponding individual concentrations of CV and TY, exerting the minimal inhibitory effect. The interactions are interpreted as synergism when the ΣFIC index<1, additive when ΣFIC=1, and antagonism when ΣFIC>1 (Bell, 2005). All tests are performed in triplicates.

Preparation of HNTs/CV and HNTs/CV-TY Hybrids:

Hybrids were prepared by shear mixing the respective EOs with HNTs followed by ultrasonication (Vibra cell VCX 750 instrument, Sonics & Materials Inc., USA) at constant amplitude of 40% for 20 min on ice bath. HNTs/CV hybrids were prepared at a weight ratio 1:2, respectively; HNTs/CV-TY hybrids were similarly prepared using a CV-TY (1:1, weight ratio) solution instead of pure carvacrol.

Preparation of LDPE Films:

Low-density polyethylene was melt-compounded at 140° C. with pure thymol, HNTs/CV hybrids and HNTs/CV-TY hybrids using a 16 mm twin-screw extruder (Prism, England) L/D ratio of 25:1 with a screw speed of 150 rpm and feeding rate of 2 kg $h^{-1}$. Subsequently, films (1 mm and 150 µm thick) are prepared by compression molding at 140° C.

Table 13 specifies the composition of the LDPE-based films studied polymer nanocomposites.

TABLE 13

| Sample | Composition (wt %) | | | |
|---|---|---|---|---|
| | LDPE | HNTs | CV | TY |
| LDPE/TY | 96 | 0 | 0 | 4 |
| LDPE/(HNTs/CV) | 94 | 2 | 4 | 0 |
| LDPE/(HNTs/CV-TY) | 94 | 2 | 2 | 2 |

Physical Characterization

Thermal Gravimetric Analysis:

Thermal gravimetric analysis (TGA) is performed using TGA-Q5000 system (TA Instruments, USA). Samples are heated under nitrogen atmosphere from room temperature to 600° C. at a heating rate of 20° C. $min^{-1}$. The results are analyzed using Universal Analysis 200 version 4.5A build 4.5.0.5 software.

High-Resolution Scanning Transmission Electron Microscopy:

High-resolution scanning transmission electron microscopy (HRSTEM) studies are conducted using a Carl Zeiss Ultra Plus instrument operated at an accelerating voltage of 30 keV. Ultra-thin sections were prepared at −150° C. with a Reichert E Ultracut microtome, using a diamond knife.

Infrared Spectroscopy:

HNTs/CV-TY hybrids were characterized by attenuated total reflectance Fourier-transform infrared (ATR-FTIR) spectroscopy. Thermo 6700 FTIR instrument equipped with a Smart iTR diamond ATR device is used and the spectra are recorded using OMNIC v8.0 software. CV and TY content in the polymer nanocomposites is determined by FTIR in transmission mode. Data analysis is performed by TQ analyst v8.0 software.

Spectra are collected from at least three different locations on the films. The areas under the peaks at 1150 $cm^{-1}$ and 1125 $cm^{-1}$, which are attributed to thymol and carvacrol, respectively (Socrates, 2001), are calculated and normalized to the film thickness. These results were used for determining the averaged CV and TY content in film employing Beer's law calibration curves.

Antimicrobial Assays

Agar Diffusion Assay

Effect of EOs Concentration on Antimicrobial Activity:

Fresh LDPE/(HNTs/CV-TY), LDPE/(HNTs/CV) and LDPE/TY films (12 mm in diameter and 150 μm thick) were conditioned at 60° C. for different time intervals to accelerate the release of the EOs from the films. The films were sampled after different durations, and the content of the respective EOs were determined by Fourier-transform infrared spectroscopy in transmission mode. Subsequently, the discs were placed onto the surface of a Luria broth (LB) agar plate seeded with $10^8$ CFU ml$^{-1}$ of E. coli culture (0.1 mL). The plates were incubated at 37° C. for 18 h, and the antibacterial potency of the films is monitored by measuring the inhibition zone around the discs. All tests were performed in triplicates, and at least 15 different specimens are studied for each film type of each. Neat LDPE films were used as a negative control.

Antimicrobial Activity of Films as a Function of Storage Time:

All polymer films were stored at room temperature in a secondary container. Once per month, the antibacterial activity of the different films is evaluated by inhibition of E. coli growth in liquid media.

In exemplary procedures, films (12 mm in diameter and 150 μm thick) were placed in 24-well plates containing 1 mL of E. coli stock suspension at a concentration of $10^5$ CFU mL$^{-1}$. The plates were incubated at 37° C. under continuous agitation (100 rpm) for 24 h. Incubation was followed by serial dilutions with in 1:100 NB (performed in 96-well plates). Viable cell counts were assessed by the drop-plate technique; 20 μL drops were incorporated into NB bacto-agar in Petri dishes (9 cm) and were incubated at 37° C. for 24 h. CFU were counted and log reduction was calculated in comparison to E. coli cultured in NB 1:100 medium ($10^8$ CFU mL$^{-1}$), used as a control. All measurements, including the growth controls were performed in triplicates.

Analysis of Interaction Between Carvacrol and Thymol:

Interactions between CV and TY were assessed based on the results obtained by the agar diffusion assay studies. Two common models of synergistic activity are applied: (1) effect additivity (Axelrad, Howard, & McLean, 2002) and (2) dose additivity (Berenbaum, 1978). The first model suggests that the combined effect of two antimicrobials is identical to the summed effect of individual antimicrobials (zero effect). If the observed effect of two antimicrobials is higher than their expected zero effect, synergy is reported, and if a lower value is obtained, an antagonistic interaction is suggested. The second model is based on building curves that illustrate various combinations of two antimicrobials that produce the same effect. Antimicrobial doses of the same efficiency are connected by the additivity line that predicts a zero interaction. Deviations from this prediction can be interpreted as antagonism or synergy.

Results

Antibacterial Activity of Essential Oils and their Combination:

The MIC of carvacrol and thymol and their combination against E. coli (ATCC 8739) were determined using the standard chequerboard procedure for antimicrobial susceptibility for combination of antimicrobials (Franzot & Casadevall, 1997; Pei et al., 2009).

Figure 13B:
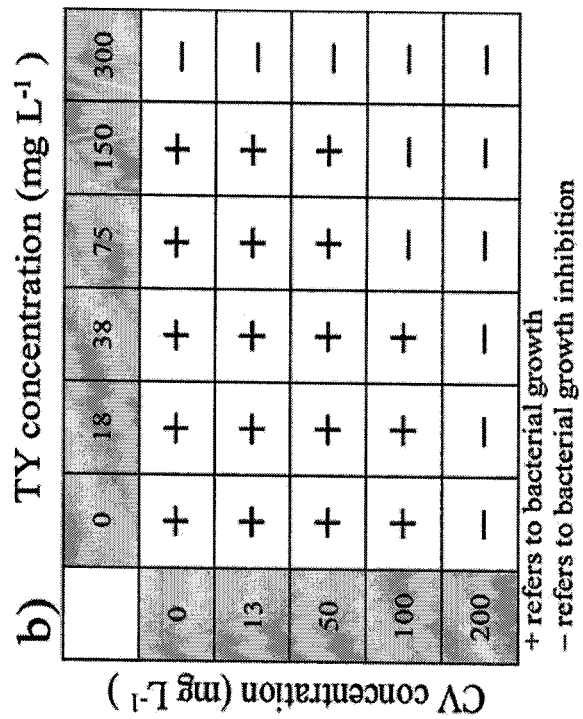
FIGS. 13A-B present *E. coli* growth curves in LB media containing a constant thymol concentration (75 mg $L^{-1}$) and varying carvacrol concentrations in the range of 0 to 200 mg $L^{-1}$ (FIG. 13A), and a summary of the antimicrobial effect of all tested combinations of carvacrol (CV) and thymol (TY) (FIG. 13B). Bacterial growth is denoted as (+) and inhibition as (−).
Figure 13A:
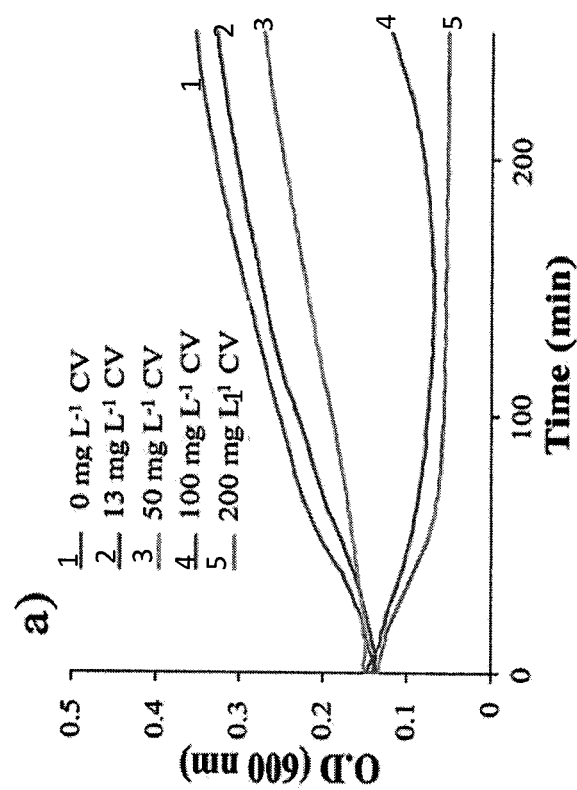

FIG. 13A presents characteristic E. coli growth curves in media containing a constant thymol concentration (75 mg L$^{-1}$) and varying carvacrol concentrations (0 to 200 mg L$^{-1}$). As carvacrol concentration increases, E. coli growth was hindered. At a concentration of 200 mg L$^{-1}$ carvacrol, a rapid decrease in the OD$_{600}$ value was observed, ascribed to bacterial cells lysis. While at a lower concentration (100 mg L$^{-1}$), a profound lag time of ~200 min in bacterial growth is recorded. At carvacrol concentrations below 100 mg L$^{-1}$, bacterial growth was observed. Based on these results, complete bacterial growth inhibition was denoted, when a lag time above 200 min was obtained. FIG. 13B summarizes the results of all tested combinations of carvacrol and thymol, in terms of bacterial growth (+) or its inhibition (-). Accordingly, the MICs of neat carvacrol (200 mg L$^{-1}$) and thymol (300 mg L$^{-1}$) were evaluated.

For the results in FIG. 13B the corresponding summed FIC indices were calculated; ΣFIC=0.75 is obtained a combination of 75 and 100 mg L$^{-1}$ of thymol and carvacrol, respectively, suggesting a synergistic antimicrobial activity.

Example 5

Preparation and Characterization of HNTs/CV-TY Hybrids

Figure 14:
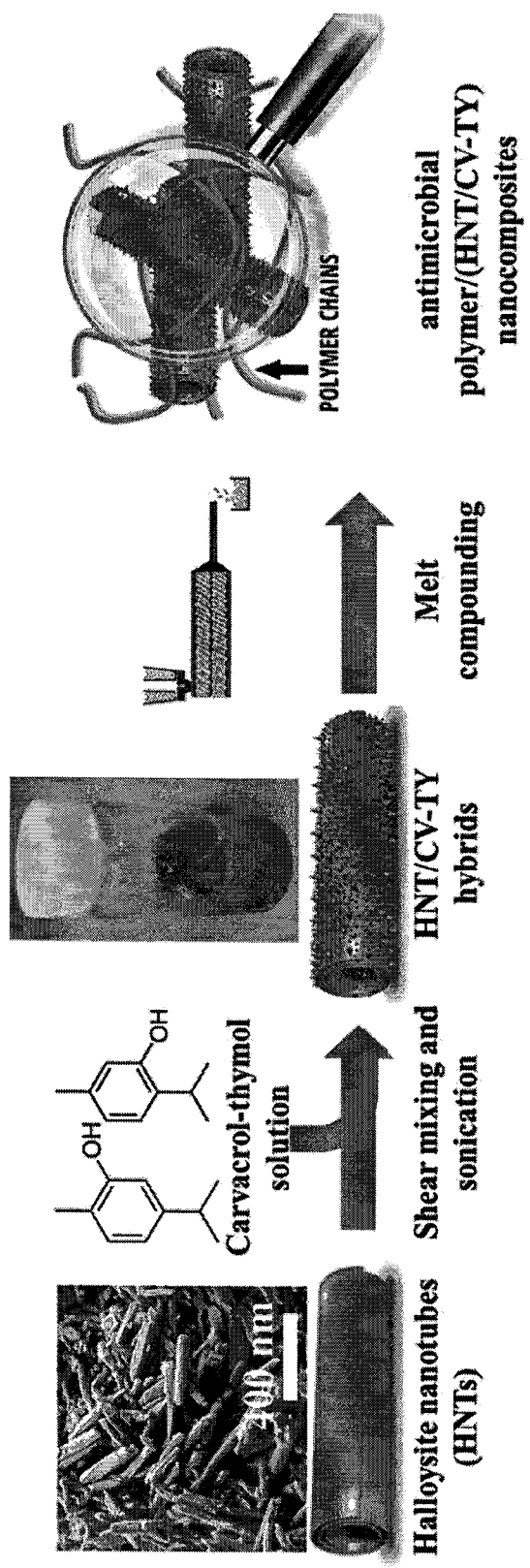
FIG. 14 presents a schematic representation of the steps followed for the fabrication of LDPE/HNTs nanocomposites: Halloysite nanotubes (HNTs) are loaded with CV-TY solution by shear mixing and sonication, resulting in HNTs/CV-TY hybrids. The hybrids are incorporated into LDPE by high-temperature melt compounding to yield antimicrobial LDPE/(HNTs/CV-TY) nanocomposite films.

Following the confirmation of synergistic antibacterial activity between carvacrol and thymol against E. coli, a solution of CV-TY (at weight ratio of 1:1) was loaded into HNTs by shear mixing and ultrasonication, as depicted in FIG. 14. The resulting HNTs/CV-TY hybrids were characterized by TGA and FTIR spectroscopy in terms of thermal stability and composition, respectively.

Figures 15A, 15B:
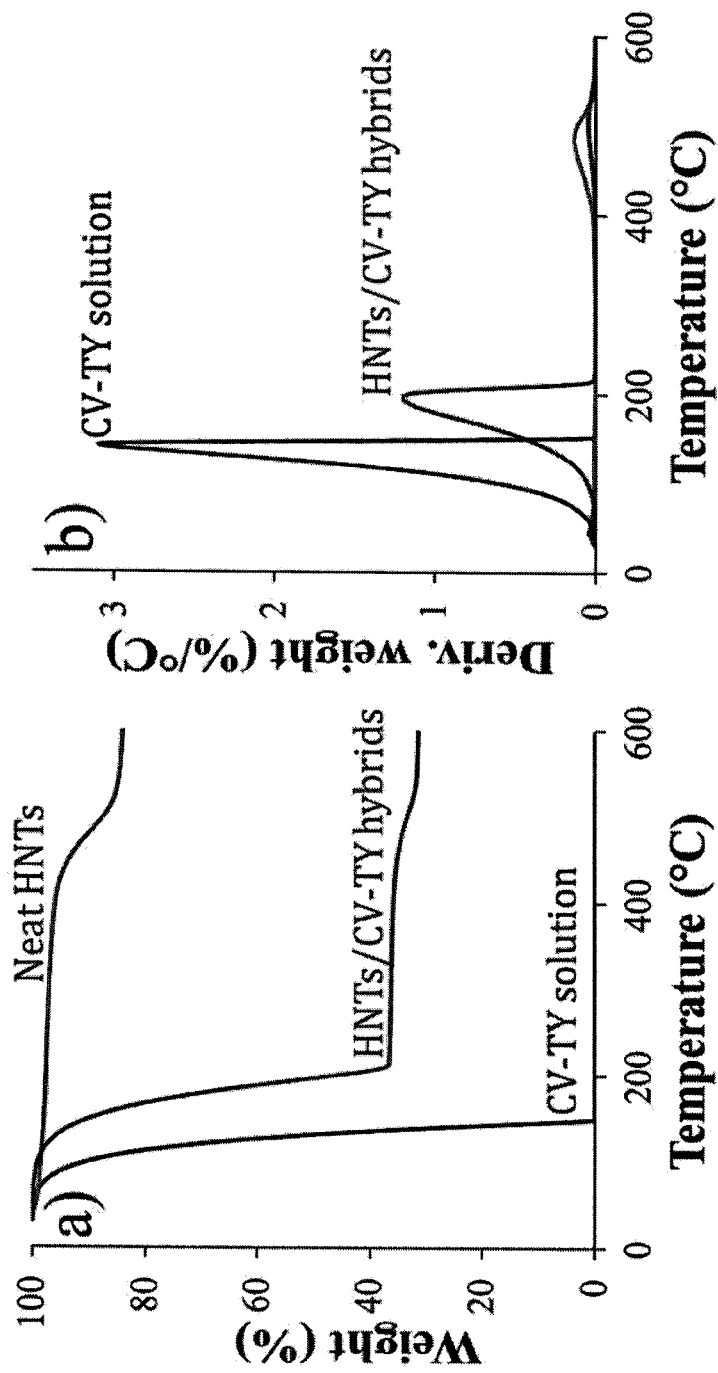
FIGS. 15A-B present TGA Thermograms (FIG. 15A) and corresponding derivative curves (FIG. 15B) of HNTs/CV-TY hybrids compared to neat HNTs and CV-TY solution.

Thermal gravimetric analysis (TGA) allows determining the thermal stability of the volatile EOs in the hybrids in comparison to the neat CV-TY solution and HNTs (FIG. 15). The thermogram and its corresponding derivative (DTG) of the CV-TY solution depicts a one-step weight loss of CV-TY (FIG. 15A), ascribed to the complete evaporation of the EOs. The onset weight loss temperature and the maximal weight loss rate are observed at 100° C. and 140° C. (FIG. 15B), respectively; and at 160° C. the EOs are completely lost (FIG. 15A). Incorporation of the CV-TY solution into the nanotubes significantly enhances its thermal stability, increasing the onset temperature by ~40° C. and the maximal weight loss rate by 55° C. (FIG. 15B). Complete loss of the EOs is observed at 215° C. Furthermore, the inorganic content within the HNTs/CV-TY hybrids is found to be 31%. This result correlates well with the initial HNT content in the hybrids.

Figures 16A, 16B:
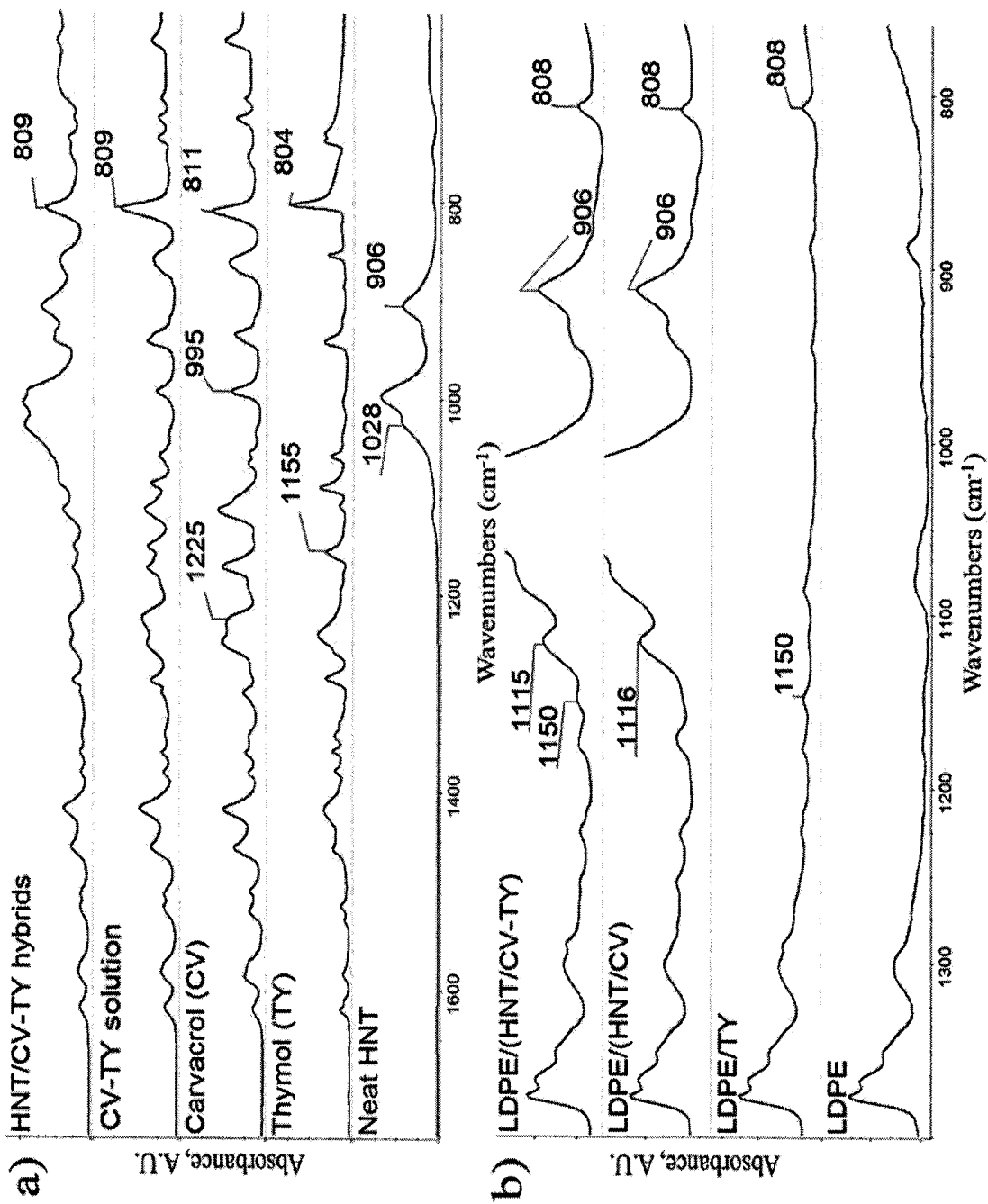
FIGS. 16A-B present attenuated total reflectance Fourier-transform infrared (ATR-FTIR) spectra of neat HNTs, pure TY, pure CV, CV-TY solution and HNTs/CV-TY hybrids, presenting the 1800-800 $cm^{-1}$ region (FIG. 16A), and FTIR spectra (transmission mode) of LDPE, LDPE/TY, LDPE/(HNTs/CV) and LDPE/(HNTs/CV-TY) films, presenting the 1400-800 $cm^{-1}$ region (FIG. 16B).
Figures 17A, 17B, 17C, 17D, 17E:
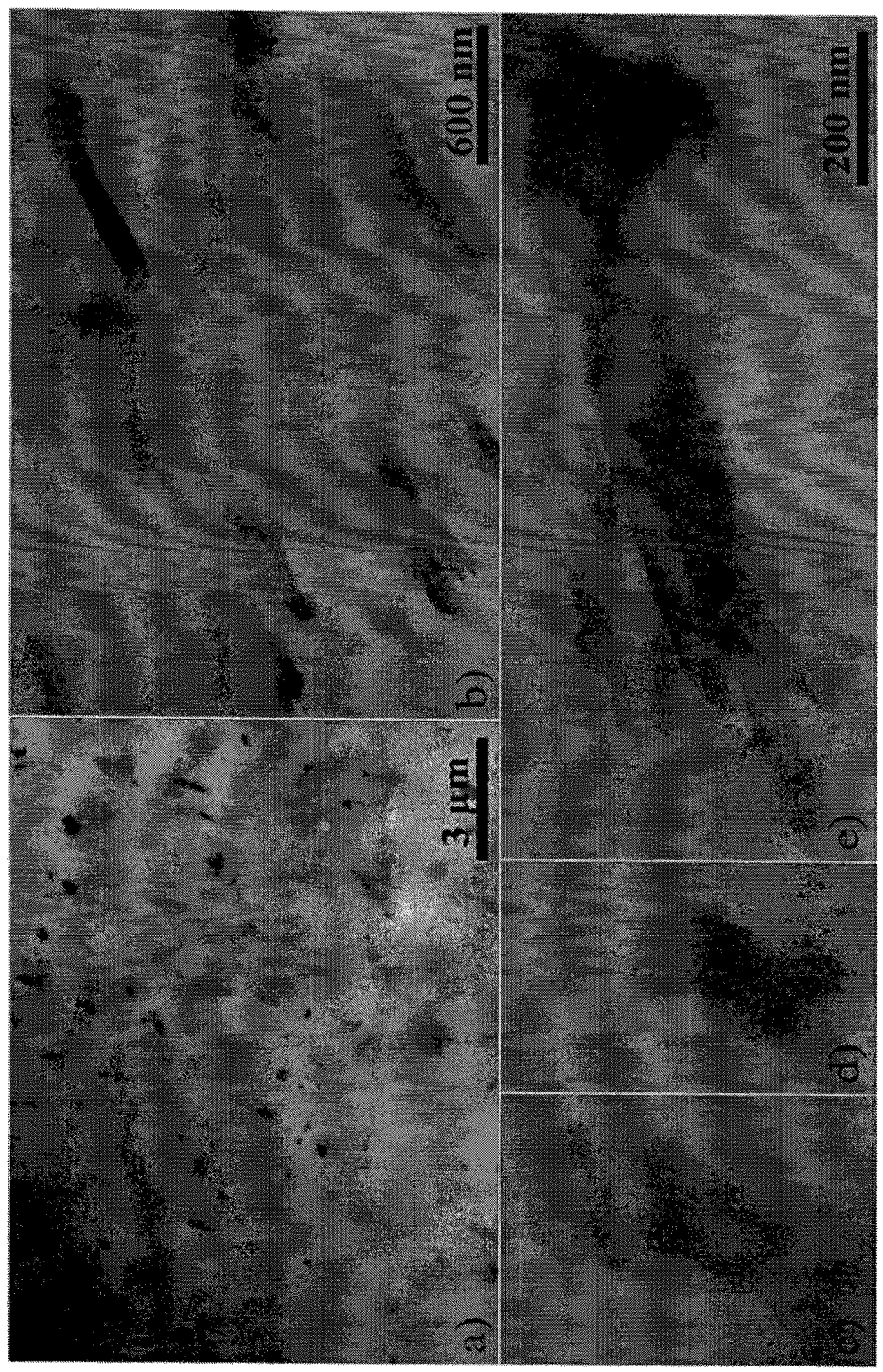
FIGS. 17A-E present HRSTEM images of ultra-thin sections of LDPE/(HNT/CV-TY) films: low (FIG. 17A) and medium magnifications of the film depicting uniform distribution of HNTs within LDPE matrix (FIG. 17B); individual HNTs embedded in LDPE matrix at a larger magnification FIG. 17C-E (the scale bar on (FIG. 17E) refers to (FIG. 17C) and (FIG. 17D) as well).

The composition of the HNTs/CV-TY hybrids was studied by ATR-FTIR. FIG. 16A presents the IR spectrum of the hybrids in comparison to the spectra of individual components i.e., HNTs, pure CV, pure TY and CV-TY solution. The spectra of CV, TY and their solution depict the strongest absorption in the 900-650 cm-1 region, ascribed to the C—H out-of-plane vibrations of the aromatic ring. Overtone and combination bands due to the C—H out-of-plane deformation vibrations are observed between 2000-1660 cm-1. The absorbance in the regions 1300-1050 cm-1 and 850-620 cm-1 stems from vibrational modes of aromatic carbon-X bond and depends on the mass of substituent X (Socrates, 2001).

Without being bound by a particular theory, it is assumed that although CV and TY are isomeric compounds, their spectra differ significantly, in particular the location of the out-of-plane CH wagging vibrations is obtained at 804 cm$^{-1}$ for TY and at 811 cm$^{-1}$ for CV (Lin-Vien, Colthup, Fateley, & Grasselli, 1991; Schulz, Özkan, Baranska, Kruger, &

Ozcan, 2005; Socrates, 2001). The HNT spectrum displays typical absorbance peaks at 3700-3600 cm$^{-1}$ (O—H bonds stretching), at 1017 and at 750 cm$^{-1}$ (perpendicular Si—O stretching), at 900 cm$^{-1}$ (O—H deformation), and at 796 cm$^{-1}$ (and symmetric stretching of Si—O) (Pal, Kundu, Malas, & Das, 2014; Yuan et al., 2008). The spectrum of HNTs/CV-TY hybrids exhibits all the major spectral elements from the individual components, namely HNTs and EOs mixture, and its high reproducibility suggests homogeneous composition.

Preparation and Characterization of LDPE-Based Films

HNTs/CV-TY hybrids were melt-compounded with LDPE at 140° C. using a twin-screw extruder, as schematically illustrated in FIG. 14. Subsequently, LDPE/(HNTs/CV-TY) films were produced by compression molding at 140° C. For comparison, LDPE-based films containing pure TY or HNTs/CV hybrids at different compositions were similarly produced (as shown in Table 13).

The nanostructure of the films was characterized by HRSTEM. FIGS. 17A-E display micrographs of ultra-thin sections of LDPE/(HNT/CV-TY) films. The HNTs are individually dispersed within the LDPE matrix. Higher-magnification images (FIGS. 17C-E) focus on the individual HNTs embedded within LDPE. It appears as a cylindrical tube, ~200 nm in external diameter.

The EOs content and distribution within the LDPE matrix are important parameters, crucial in determining the mechanical and antimicrobial performance of the nanocomposite systems (R. Shemesh et al., 2015). Thus, the total volatile content within the LDPE-based films was investigated using TGA, and the results are summarized in Table 14 showing carvacrol and thymol concentrations in different LDPE-based films as determined by TGA and FTIR spectroscopy.

TY and CV concentration are significantly reduced by 35% and 55%, respectively, indicating that a substantial portion of the EOs was lost during the high-temperature processing. Moreover, films containing pure TY are opaque and non-homogeneous, and TY crystals could be clearly observed on the polymer surface. On the other hand, the volatile content in LDPE/(HNTs/CV) and LDPE/(HNT/CV-TY) films was preserved to a significantly higher extent (80% of the EOs were retained during the high-temperature processing).

These results demonstrate that the encapsulated EOs can withstand processing at elevated allowing to produce uniform and transparent EOs-containing LDPE films.

TABLE 14

| Film composition | Initial CV-TY content, % | Total volatile content, % By TGA | Carvacrol content, % | Thymol content, % By FTIR |
|---|---|---|---|---|
| LDPE/TY | 0-4 | 2.6 ± 0.1 | 0 | 2.4 ± 0.3 |
| LDPE/CV (*) | 4-0 | 1.8 ± 0.1 | n/a | n/a |
| LDPE/(HNT/CV) | 4-0 | 3.2 ± 0.1 | 3.3 ± 0.3 | 0 |
| LDPE/(HNT/CV-TY) | 2-2 | 3.2 ± 0.1 | 2.0 ± 0.3 | 1.4 ± 0.3 |

(*) (R. Shemesh et al., 2015)

Thermal gravimetric analysis is a robust method for determination of volatile organic content within polymers [(Hosseini, Zandi, Rezaei, & Farahmandghavi, 2013; Pelissari, Grossmann, Yamashita, & Pineda, 2009; Wen et al., 2016)].

However, for the LDPE/(HNTs/CV-TY) system, TGA can only determine the total volatile content within the polymer matrix, and cannot distinguish between CV and TY due to the overlap in their evaporation and degradation temperatures. Employing FTIR spectroscopy allows determining the individual concentration of CV and TY within the LDPE/(HNTs/CV-TY) films in a non-destructive manner.

FIG. 16B presents the characteristic FTIR spectra of all studied films. Herein, the peaks at 1125 cm$^{-1}$ and 1150 cm$^{-1}$ were used to attributed to out-of-plane deformation vibrations in CV and in TY molecules, respectively (Socrates, 2001). The area under these peaks is correlated to the in-film concentrations of the respective EOs, using proper calibration curves.

Notably, the prominent peaks for CV and TY, discussed hereinabove, overlap with IR absorption bands of other film components. For example, the characteristic HNTs bands completely mask the CV and TY peaks in the region 1100-900 cm$^{-1}$; additionally, the out-of-plane CH wagging vibrations at 804 cm$^{-1}$ for TY and at 811 cm$^{-1}$ for CV, merge into a single band at 808 cm$^{-1}$ (Schulz et al., 2005). As noted above, Table 14 presents the CV and TY content within the different films, as determined by FTIR analysis. There is a good correlation between the FTIR and TGA results.

So far, it has been further confirmed the crucial role of the HNT-based hybrids retaining a high content of volatile EOs within melt-processed LDPE films and it has been demonstrated that this approach is not limited to only carvacrol, but can be applied to other EOs and their combinations. Moreover, it should be noted that the hybrids significantly enhance films quality in terms of their appearance and optical properties. Next, the biological functionality of the retained EOs in the films was assessed in terms of their antimicrobial properties and potential applicability for active antimicrobial packaging.

Antibacterial Activity of LDPE-Based Films:

The antimicrobial activity of all LDPE-based films was studied using the Kirby-Bauer disk diffusion test with an emphasis on establishing the synergistic interaction between the CV and TY following their incorporation into LDPE by melt compounding and film production.

Figure 18C:
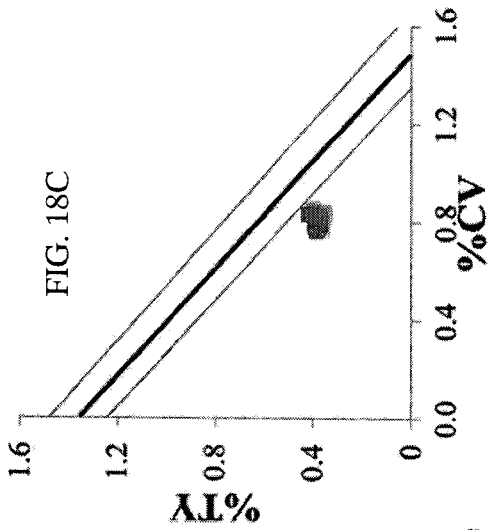
FIGS. 18A-C present the results of agar diffusion test and the effect of EOs concentration within LDPE films on their antimicrobial activity: optical image of inhibition zone around LDPE films containing HNTs/CV-TY hybrids (FIG. 18A); geometric representation of effect additivity model built for LDPE films that contain CV, TY and CV-TY at a total concentration of 1.3% w/w (0.8% and 0.5% respectively) (FIG. 18B); CV and TY in-film concentrations to obtain the antimicrobial effect of 19 mm inhibition zone (dose additivity model) (FIG. 18C). Graph "-" implies expected additivity line and graph " . . . " denotes standard deviation limits.

All fresh LDPE-based films were cut into discs (12 mm in diameter). The discs were conditioned at 60° C. for different time intervals to accelerate the release of the EOs from the specimens. As the EOs were released from the discs to a different extent, depending on the duration of the treatment, a collection of specimens with different CV and/or TY concentrations was obtained. The antimicrobial activity of all discs was characterized using the Kirby-Bauer disk diffusion method. Importantly, the concentrations of CV and/or TY within the LDPE discs were measured by IR spectroscopy directly before the antimicrobial test, allowing for relating the diameter of inhibition zone around the specimen, as shown in FIG. 18A, to the concentration of EOs within the same specimen that produced this effect. Basing on these results, the interactions between carvacrol and thymol were analyzed using two common models for synergistic activity: dose additivity and effect additivity models.

Figure 18B:
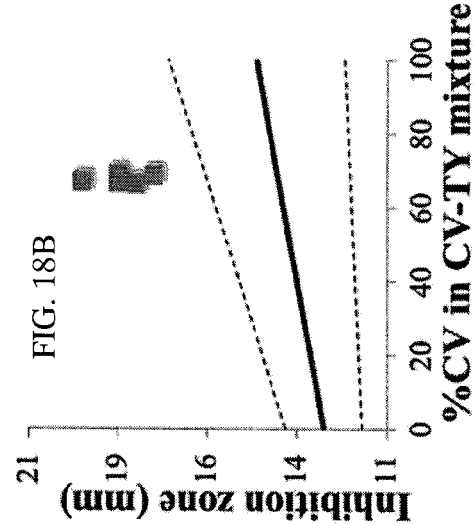
Figure 18A:
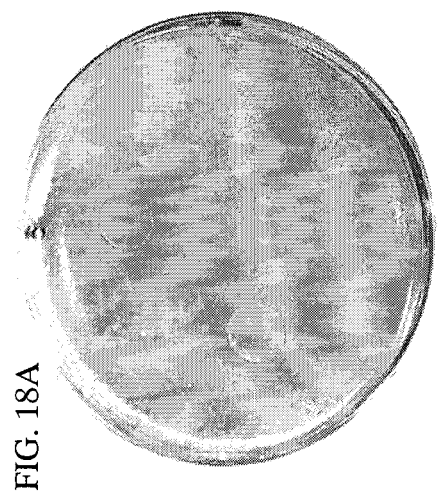

FIG. 18B is the geometric representation of effect additivity model built for LDPE films that contain CV, TY and CV-TY at a total concentration of 1.3% w/w that was chosen for demonstration purposes. Thus, an LDPE/TY film with 1.3% w/w of TY results in 13 mm inhibition zone, while an LDPE/(HNTs/CV) film with 1.3% w/w CV yields ca 14.5 mm inhibition zone effect. However, an LDPE/(HNTs/CV-TY) film that contains 1.3% w/w of both CV and TY (0.8%

CV and 0.5% TY) exhibits far bigger/wider inhibition zone of ca 18 mm. This behavior falls far above the additivity line, accounting for synergistic interaction. This behavior was characteristic for all studied compositions in range 1.1%-2.4% of total antimicrobial agents.

FIG. 18C is the geometric representation of dose additivity model for different LDPE-based films that contain CV, TY and CV-TY for a selected antimicrobial effect of 19 mm inhibition zone that was chosen for demonstration purposes. Thus, LDPE-based films that contain 1.5% CV or 1.4% TY or 1.2% of CV-TY mixture exhibit antimicrobial effect of similar potency (19 mm inhibition zone). On the geometric representation, points that characterize the antimicrobial activity of LDPE/(HNTs/CV-TY) films fall below the additivity line, indicating for the synergistic effect. This behavior was characteristic for antimicrobial effects between 13 and 20 mm inhibition zone, exerted by studied films.

Figure 19:
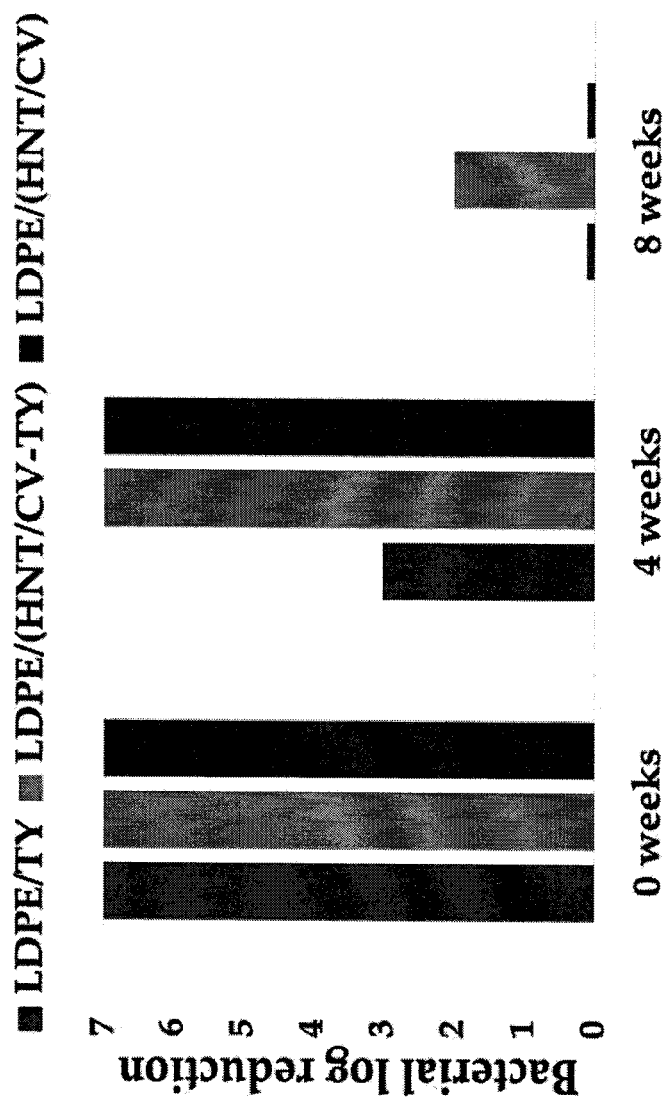
FIG. 19 presents bar graphs showing the antibacterial activity against *E. coli* by liquid flask method of LDPE/TY, LDPE/(HNTs/CV hybrids) and LDPE/(HNTs/CV-TY hybrids) films vs. storage time at room temperature. Log reduction of 7 implies full inhibition of bacterial growth. Log reduction of 0 corresponds to no antimicrobial activity. In each triple bars: left bar refers to LDPE/TY, middle bar refers to LDPE(HNT/CV-TY) and right bar refers to LDPE (HNT/CV).

Based on these results, one can expect that LDPE films that contain CV-TY synergistic mixture would perform longer than LDPE films that contain individual antimicrobials, given the same film storage conditions. Therefore, the shelf life of HNTs/CV-TY hybrid containing films was characterized and compared to that of polymer films containing individual antimicrobials. Briefly, all polymer films were stored at room temperature in a secondary container, mimicking typical warehouse storage conditions. Once per 4 weeks, antimicrobial activity of each film was evaluated by liquid flask test, as summarized by FIG. 19. All studied films start with bacterial growth reduction by 7 orders of magnitude, corresponding to full inhibition. After 4 week storage at room temperature, antimicrobial activity of LDPE/TY films drops to 3 orders of magnitude, while the other two films continue to exhibit full inhibition. This sudden decrease in antimicrobial activity is ascribed to the low TY content in LDPE films, which stems from the fact that TY was not incorporated within HNTs before thermal processing, as was discussed earlier. However, after 8 weeks of storage, only LDPE/(HNTs/CV-TY hybrids) films continued to show some extent of inhibition, while the other films were no longer antimicrobial. Thus, LDPE films that contain CV-TY synergistic mixture perform longer than their counterparts that contain individual antimicrobials.

Figure 20:
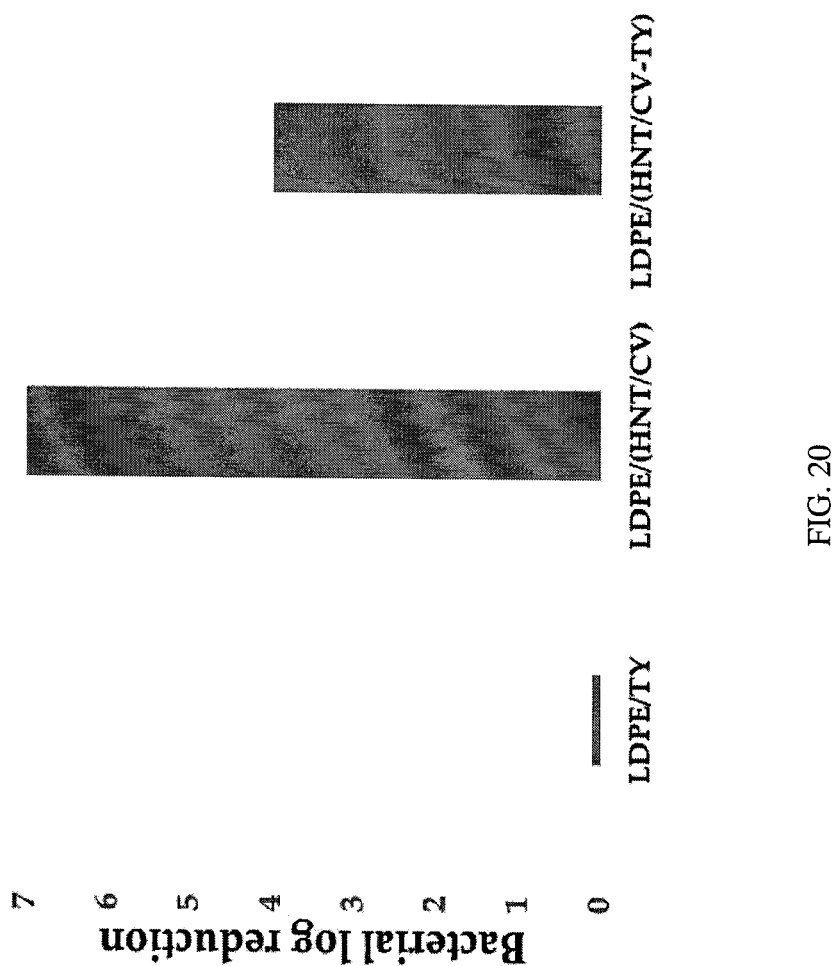
FIG. 20 presents bar graph showing the antibacterial activity against *E. coli* of LDPE/TY, LDPE/(HNTs/CV hybrids) and LDPE/(HNTs/CV-TY hybrids) films, using ground preservative free hummus as a food model. Log reduction of 9 implies full inhibition of bacterial growth. Log reduction of 0 corresponds to no antimicrobial activity.

It is a fact that there is a difference between antimicrobial activity in vitro and in real food systems. Interactions of antimicrobial agents with different food components (such as fats, proteins, and sugars) often result in inferior antimicrobial activity (Gutierrez et al., 2008). Thus, to evaluate and compare the antibacterial characteristics of all LDPE polymer films, in a relevant food system, hummus beans were used as a food model. Thus, preservative free hummus beans were ground into puree, diluted 1:10 with a sterile saline, inoculated with E. coli to contain $10^2$ CFU mL$^{-1}$. The hummus was then incubated (at 37° C. for 22 h) with the different films (without direct contact), followed by total count. The results (FIG. 20) reveal that LDPE/(HNT/CV) films retard the growth of E. coli, generating a profound and reproducible decrease of 4 orders of magnitude. Nevertheless, LDPE/(HNT/CV) films are outperformed by LDPE/(HNT/CV-TY) films, which reduce bacterial growth by 7 orders of magnitude. Notably, LDPE/TY films show no antimicrobial effect at all.

As shown hereinabove, it was demonstrates LDPE-based films containing synergistic mixture of carvacrol and thymol incorporated within halloysite nanotubes. It was confirmed that the integration of carvacrol and thymol mixture within halloysite nanotubes prior to melt compounding greatly enhances thermal stability of incorporated organic materials and results in high content of antimicrobial agent within LDPE films after thermal processing. Due to combined synergistic antimicrobial activity of carvacrol and thymol, the antimicrobial activity of these films against E. coli was found to be more potent than the antimicrobial activity of LDPE-based films containing individual carvacrol and thymol. These LDPE films have enormous potential to be employed as materials for various applications, especially in food packaging, where these films can significantly improve food safety and prolong shelf life of the food products, retaining high antimicrobial activity at low concentrations of antimicrobial agents.

Example 6

Establishing of Optimal Ratio Between the HNTs and the Essential Oils (EOs)

Methods

Preparation of HNTs/(Carvacrol (CV) and HNTs/Carvacrol-Thymol (CV-TY) Hybrids:

Hybrids were prepared by shear mixing the respective EOs or their mixtures with the HNTs followed by ultrasonication (Vibra cell VCX 750 instrument, Sonics & Materials Inc., USA) at constant amplitude of 40% for 20 min on ice bath. HNTs/CV hybrids were prepared at a weight ratio 1:2, respectively; HNTs/CV-TY hybrids were similarly prepared using a CV-TY (1:1, weight ratio) solution instead of pure carvacrol.

Thermal Gravimetric Analysis:

Thermal gravimetric analysis (TGA) is performed using TGA-Q5000 system (TA Instruments, USA). Samples are heated under nitrogen atmosphere from room temperature to 600° C. at a heating rate of 20° C. min$^{-1}$. The results are analyzed using Universal Analysis 200 version 4.5A build 4.5.0.5 software.

Results

Figure 21:
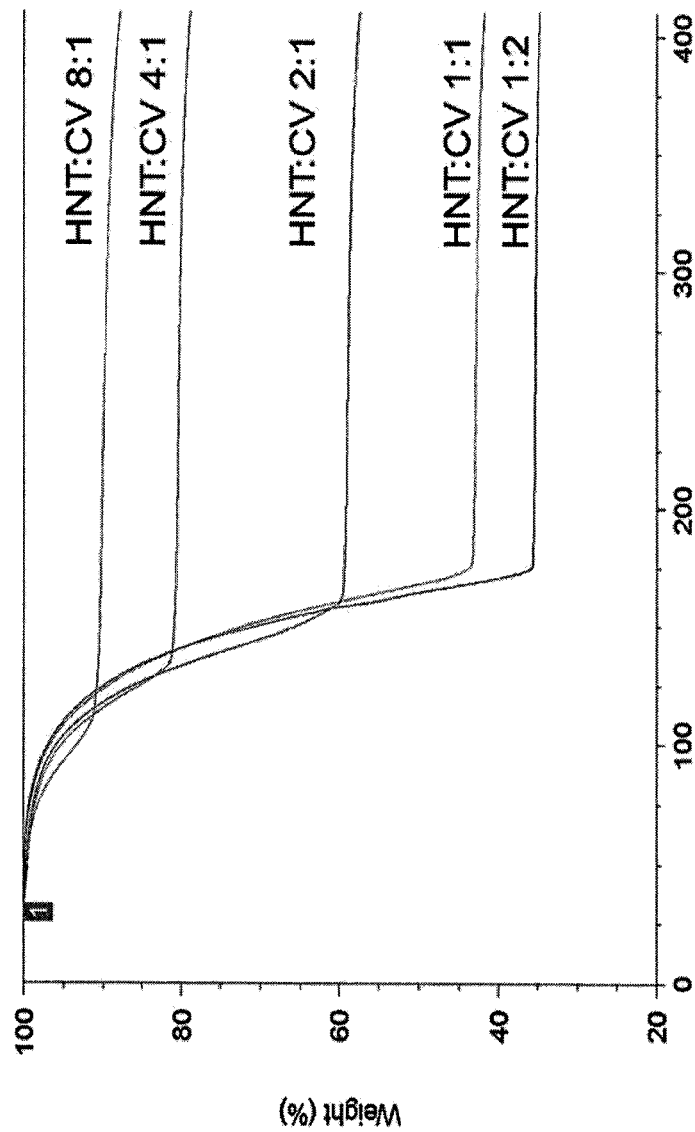
FIG. 21 presents graphs showing TGA and derivative TG (DTG) curves of HNT/CV hybrids with different HNT:CV ratio.
Figures 22A, 22B:
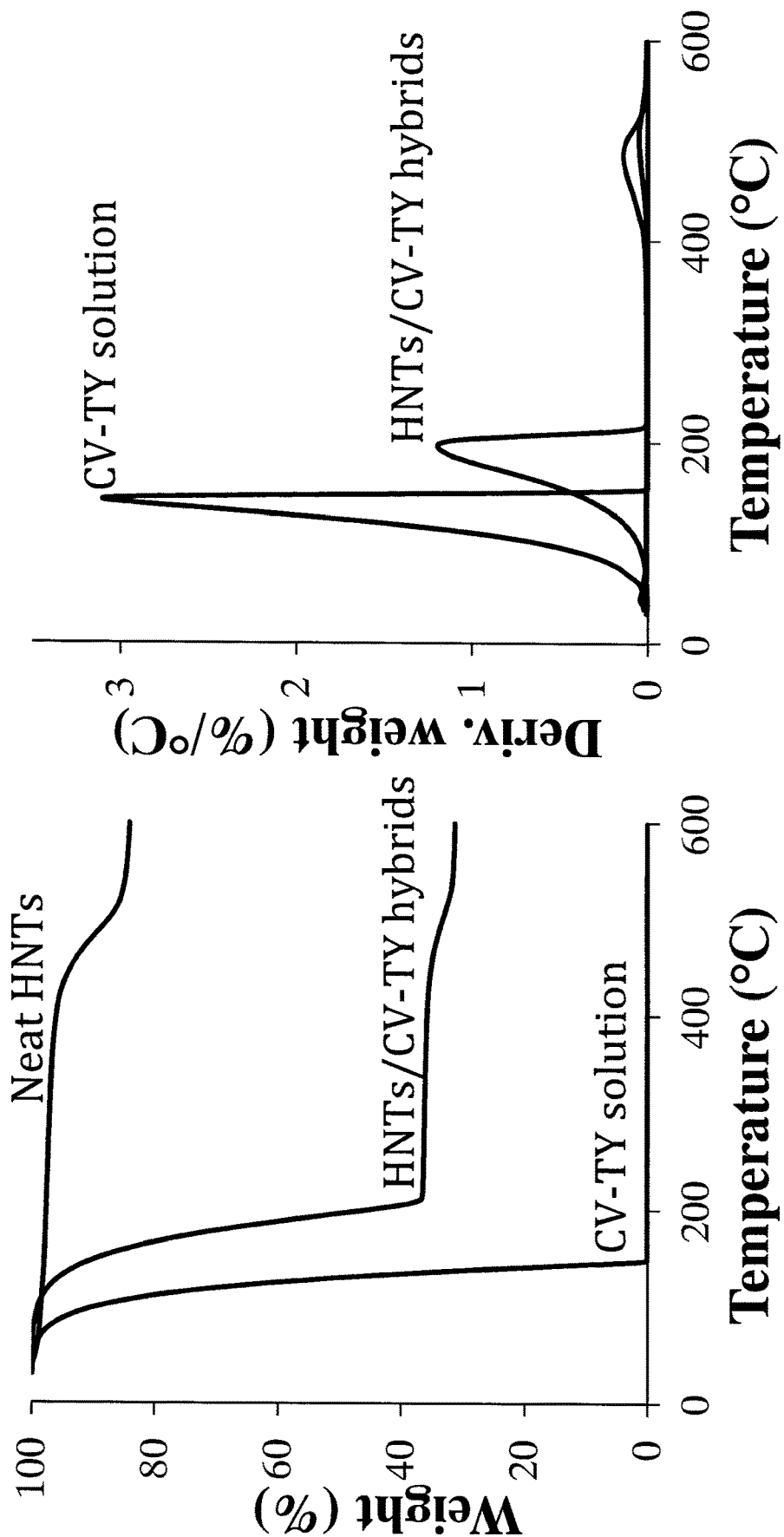
FIG. 22A-F present graphs showing comparative TGA and DTG curves of TGA of CV-TY mixture: HNT and HNT-CV-TY hybrids (FIG. 22A, and FIG. 22B); Citral, HNT and HNT-Citral hybrids (FIG. 22C, and FIG. 22D), and TGA of Geraniol, HNT and HNT-Geraniol hybrids (FIG. 22E, and FIG. 22F).
Figures 22C, 22D:
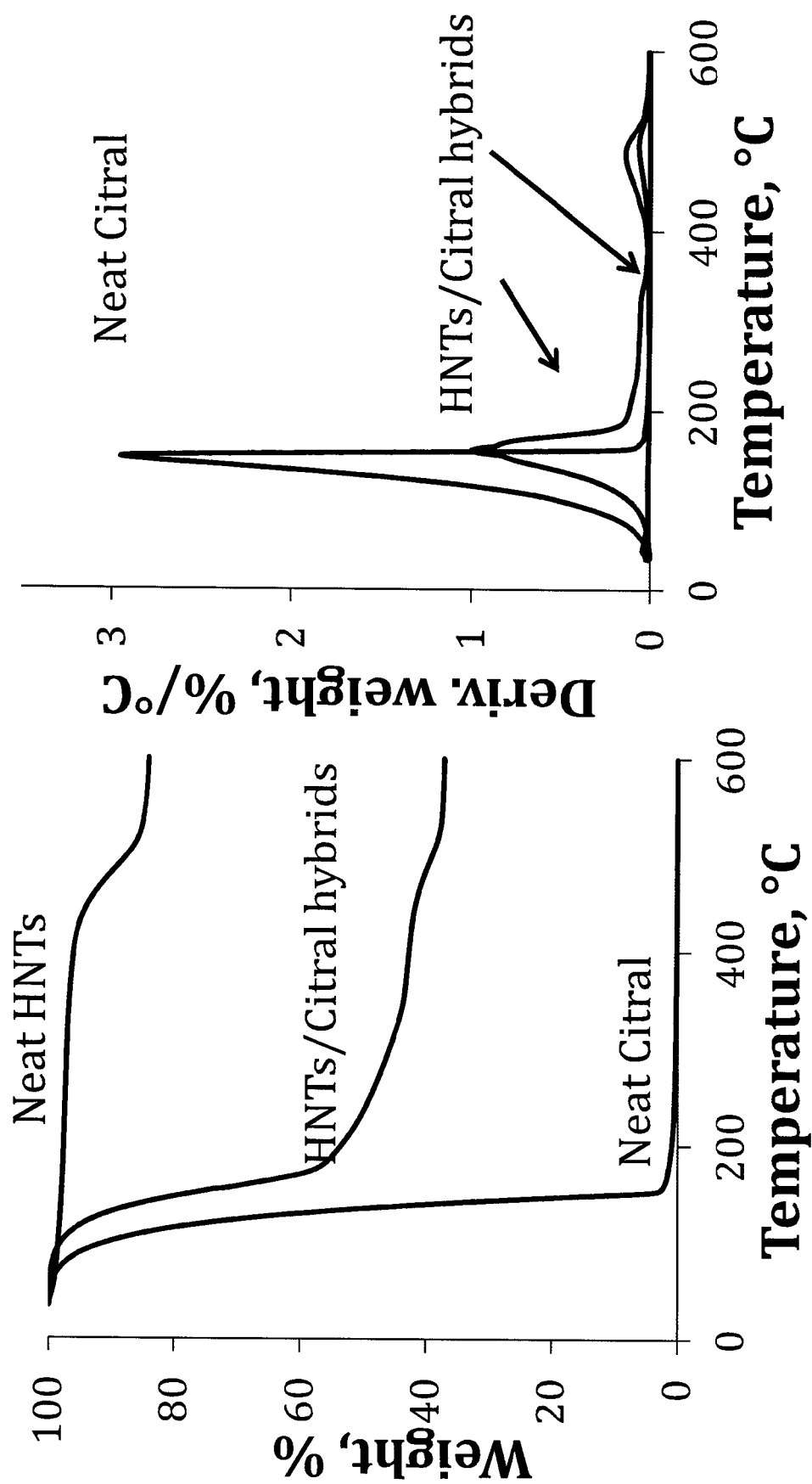
Figure 22F:
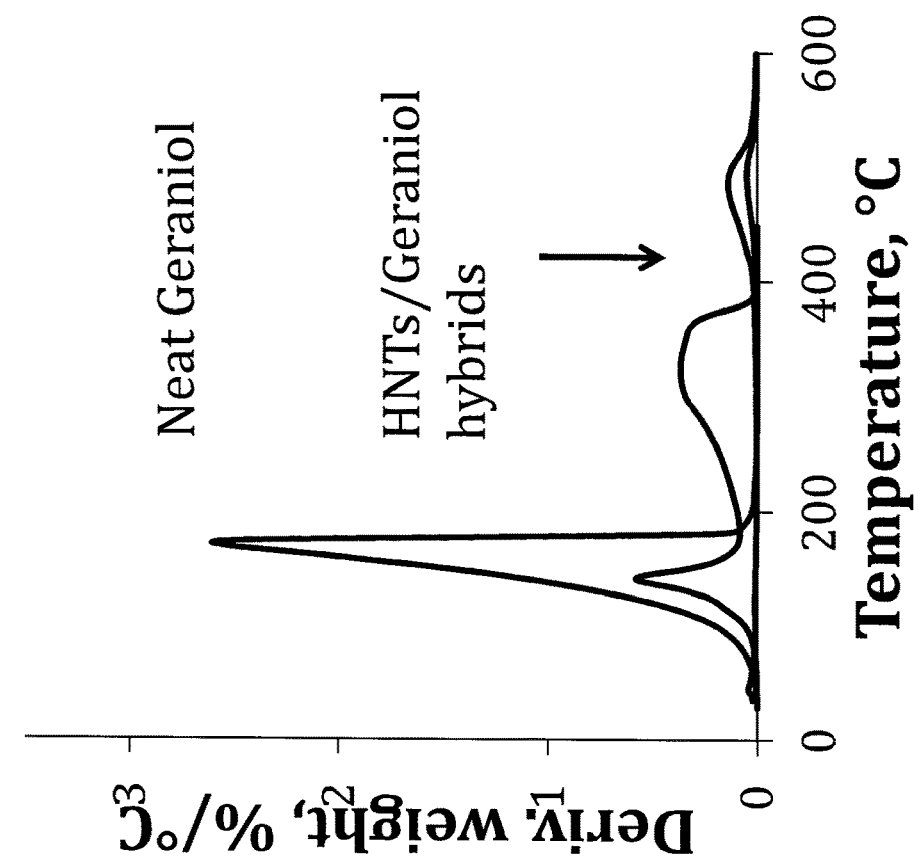
Figure 22E:
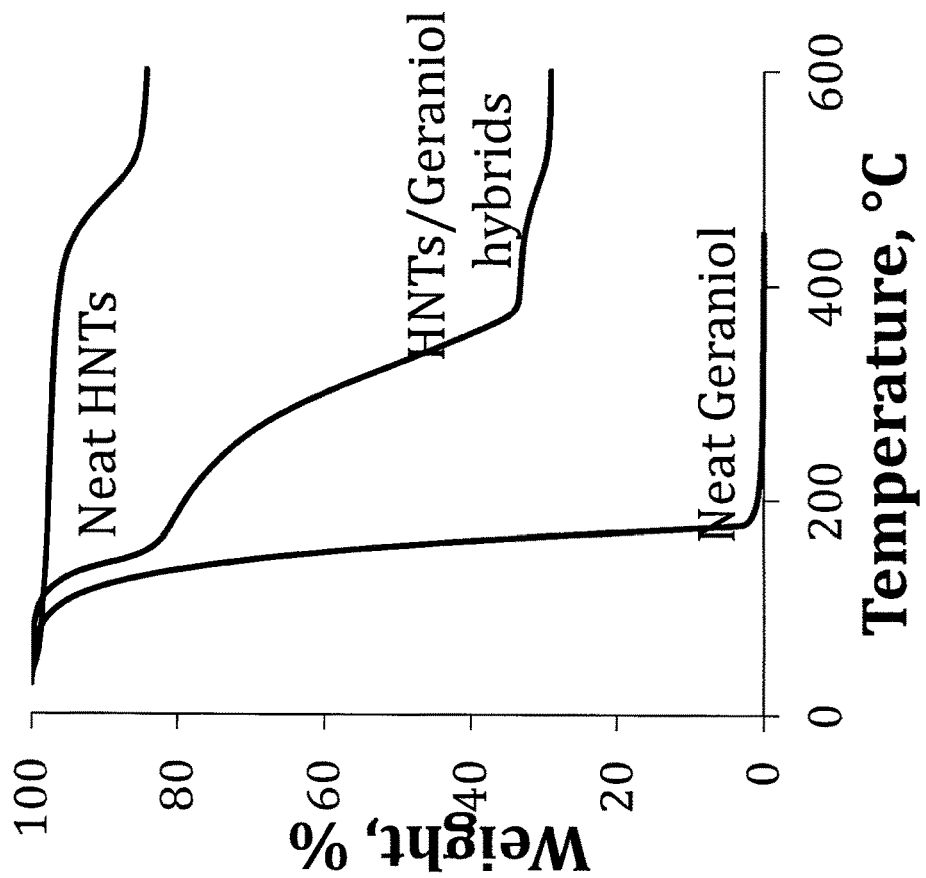

Thermal stability of the EOs encapsulated within the HNTs or physisorbed on the nanotube surface are the crucial parameters, determining the retained EOs within the polymer, following the high-temperature melt compounding and processing steps. Thus, in attempt to evaluate the most efficient HNTs/EO hybrid composition in terms of enhanced thermal stability of EO, HNTs/CV hybrids (using CV as a model EO) with various HNT:CV ratios (1:2, 1:1, 2:1, 4:1 and 8:1) were prepared. The resulting hybrids were characterized by TGA, focusing on the volatile partition loss, i.e. CV. The thermograms of all studied hybrids are presented in the FIG. 21. All thermograms show a one-step weight loss of CV, while it can be clearly seen the at a higher HNT content in the hybrids CV evaporates earlier. Based on this results, the EO (CV in this case) has a greater thermal stability when incorporated with HNTs at a ratio of HNT:CV of 1:2.

Further, the similar studies were conducted with other volatile antimicrobial agents, i.e. geraniol and citral. The results are shown in FIGS. 22A-F.

Similarly to the results with CV, hybrids with HNT:EO ratio of 1:2 showed the greatest thermal stability, which was not further improved by employing hybrids with a higher HNT content. Thus, it was shown that the ratio of HNT:EO 1:2 is optimal in terms of thermal stability of the encapsulated EO, and this ratio should be further used for subsequent melt compounding with various polymers.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composition comprising a melt-compounded composition-of-matter comprising: a dehydrated halloysite hollow mineral tube encapsulating one or more essential oils (EOs) within low-density polyethylene (LDPE) matrix, wherein the weight ratio of said dehydrated hollow mineral tube to said one or more EOs is 4:1 to 1:4, wherein said one or more EOs comprise carvacrol, wherein at least 90% of carvacrol's pre-melt content is maintained within the melt-compounded composition.

2. The composition-of-matter of claim 1, wherein said one or more EOs are characterized by vapor pressure of at least about 0.001 mmHg at about 20° C.

3. The composition-of-matter of claim 1, wherein said one or more EOs further comprise an EO selected from the group consisting of: thymol, citral, or any isomer, derivative and mixture thereof.

4. The composition-of-matter of claim 1, wherein said hollow mineral tube is nanosized.

5. The composition-of-matter of claim 1, capable of withstanding temperatures of up to about 400° C. with having less than 50% evaporation of said one or more EOs.

6. The composition-of-matter of claim 1, for use in inhibiting a growth of a pathogenic microorganism.

7. The composition-of-matter of claim 6, wherein the one or more EOs act in synergy.

8. The composition-of-matter of claim 7, wherein said EOs are carvacrol and thymol, being in a weight ratio that ranges from 2:1 to 1:2.

9. An article comprising the composition-of-matter of claim 1, said article being selected from the group consisting of: a package, microelectronic device, a microelectromechanic device, a photovoltaic device, a microfluidic device, a medical device, a textile, and a construction element.

10. A method of inhibiting or reducing a formation of load of a microorganism and/or a formation of a biofilm, in and/or on an article, the method comprising incorporating the composition-of-matter of claim 1 in and/or on said article, wherein said microorganism is selected from bacteria, molds and fungi.

11. A process of preparing the composition-of-matter of claim 1, comprising a dehydrated halloysite hollow mineral tube having deposited on at least one surface thereof one or more EOs, the process comprising depositing said one or more EOs on said dehydrated hollow mineral tube by applying a deposition route selected from: plating, chemical bath deposition (CBD), spin coating, chemical vapor deposition (CVD), ultrasonic irradiation, thereby obtaining said composition-of-matter; and melt-compounding an EO loaded dehydrated hollow mineral tube and low-density polyethylene (LDPE) matrix.

12. The process of claim 11, wherein said ultrasonic irradiation is applied by subjecting a mixture of said one or more Eos being in contact with said dehydrated hollow mineral tube to ultrasonic irradiation.

* * * * *